US012742595B2

(12) United States Patent
Alexander et al.

(10) Patent No.: US 12,742,595 B2
(45) Date of Patent: Sep. 22, 2026

(54) GRAIN DRYER OUTPUT CAPACITIVE MOISTURE SENSING ASSEMBLY AND RELATED METHODS

(71) Applicant: CTB, Inc., Milford, IN (US)

(72) Inventors: Randy P. Alexander, Goshen, IN (US); Benjamin P. Cragun, Lebanon, IN (US); Glen W. Stowers, Frankfort, IN (US); Alexander J. Krejcie, Chicago, IL (US)

(73) Assignee: CTB, Inc., Milford, IN (US)

( * ) Notice: Subject to any disclaimer, the term of this patent is extended or adjusted under 35 U.S.C. 154(b) by 1245 days.

(21) Appl. No.: 17/681,791

(22) Filed: Feb. 27, 2022

(65) Prior Publication Data

US 2022/0282919 A1 Sep. 8, 2022

Related U.S. Application Data

(60) Provisional application No. 63/156,565, filed on Mar. 4, 2021.

(51) Int. Cl.
*F26B 25/22* (2006.01)
*G01N 27/04* (2006.01)

(52) U.S. Cl.
CPC ........... *F26B 25/22* (2013.01); *G01N 27/048* (2013.01); *F26B 2200/06* (2013.01)

(58) Field of Classification Search
CPC ...... F26B 25/22; F26B 2200/06; F26B 17/12; G01N 27/048; G01N 33/10; G01N 27/223
See application file for complete search history.

(56) References Cited

U.S. PATENT DOCUMENTS 4,750,273 A 6/1988 Parkes et al.
5,560,246 A 10/1996 Bottinger et al.
(Continued)

FOREIGN PATENT DOCUMENTS

CA 2182989 C * 3/2001 ........... G01N 27/226
CA 2823053 A1 * 2/2014 ........... G01N 27/223
(Continued)

OTHER PUBLICATIONS

Translation JP-2015181421-A (Year: 2015).*
(Continued)

*Primary Examiner* — Jessica Yuen
(74) *Attorney, Agent, or Firm* — Harness, Dickey & Pierce, P.L.C.

(57) ABSTRACT

A main discharge channel can carry a main portion of the grain output from a grain dryer during operation of the grain dryer. A sensor channel positioned adjacent the main discharge channel can carry a sensed portion of the grain output from the grain dryer during operation of the grain dryer. A grain moisture sensor can include a pair of capacitive plates positioned on opposite sides of the sensor channel with opposing major surfaces of the pair of capacitive plates facing each other. A moisture sensing electric field can be generated between a main sub-plate of a plurality of sub-plates of each of a pair of capacitive plates positioned on opposite sides of a sensor channel with opposing major surfaces of the pair of capacitive plates facing each other. At least one additional electric field can be generated between the plurality of sub-plates of the pair of capacitive plates.

25 Claims, 22 Drawing Sheets

(56) References Cited

U.S. PATENT DOCUMENTS

| | | | |
|---|---|---|---|
| 6,285,198 | B1 | 9/2001 | Nelson et al. |
| 6,686,749 | B2 | 2/2004 | Rains et al. |
| 2013/0000393 | A1 | 1/2013 | Cash et al. |

FOREIGN PATENT DOCUMENTS

| | | | | |
|---|---|---|---|---|
| CN | 2248875 | Y | 3/1997 | |
| CN | 105675656 | A | 6/2016 | |
| EP | 0034459 | A2 * | 8/1981 | ........... G01N 27/223 |
| JP | S5651067 | U | 5/1981 | |
| JP | S57129646 | A | 8/1982 | |
| JP | S59147977 | A | 8/1984 | |
| JP | 2015181421 | A * | 10/2015 | |
| WO | WO-8910548 | A1 | 11/1989 | |

OTHER PUBLICATIONS

Dryer Master. Moisture Sensor Rotary Feed Chutes, Dryermaster.com, Kitchener, Ontario, Canada, 2019, 2 pages.
AGCO. Material Sampling Automatic Grain Samplers InterSystems GSI, www.grainsystems.com, Omaha, NE, Oct. 2020, 8 pages.
AGCO The GSI Group, LLC. Static Moisture Sampler for Portable Dryers, Https://Www.grainsystems.com/Content/Grainsystems/Master/Products/Conditioning/Continuous-Flow-Dryers/Portable-Static-Moisture-Sampler.html, Omaha, NE, Feb. 2022, 8 pages.
Invitation to Pay Additional Fees regarding Patent Application No. PCT/US2022/018425, dated Jul. 6, 2022.
International Search Report and Written Opinion mailed Oct. 14, 2022, in corresponding International Application No. PCT/US2022/018425.
Requisition by the Examiner received in corresponding Canadian Application No. 3,151,182 on Apr. 5, 2023.

* cited by examiner 208
210
205
186
186
189
189
180
180
182
182

GRAIN DRYER OUTPUT CAPACITIVE MOISTURE SENSING ASSEMBLY AND RELATED METHODS

CROSS-REFERENCE TO RELATED APPLICATIONS

This application claims the benefit of U.S. Provisional Application No. 63/156,565, filed on Mar. 4, 2021. The entirety of the above application is hereby incorporated herein by reference.

FIELD

The present disclosure relates to grain dryer output capacitive grain moisture sensors.

BACKGROUND

This section provides background information related to the present disclosure which is not necessarily prior art.

Output or dry capacitive moisture sensors of grain dryers are typically located at or near the grain dryer output. Such output moister sensors detect the resulting moisture content of the exiting grain that has been dried in the grain dryer, from which the final or ultimately resulting grain moisture content can be inferred. This information can be used to adjust operation of the grain dryer to achieve a target moisture level or range of the dried grain at the moisture sensor. Typically, such grain dryer output or dry capacitive moisture sensors either capture and hold a grain sample for sensing, and then release it, or monitor the grain as it continually passes over the output sensor. Capture, hold, and release grain moisture sensing mechanisms can suffer from excessive wear and maintenance issues resulting in excessive reliability and cost disadvantages.

On the other hand, capacitive moisture sensors that measure continuously flowing grain passing over it can suffer from excessive moisture measurement variability. For example, there is greater variability in the passing grain volume that is sensed and the speed at which the grain flows over the capacitive moisture sensor. Such grain output or dry moisture sensors are typically located along a floor of the grain dryer near the output through which dried grain exits the grain dryer. This means the capacitive plates are aligned in a common plane with each other as shown in FIG. 1 (in contrast to opposing or facing parallel capacitive plates, which are spaced apart from each other at a predetermined or uniform distance). In this arrangement the spacing or gap between the capacitive plates is between ends or edges of the aligned capacitive plates (in contrast to the spacing or gap being between the major faces or surfaces of opposing parallel capacitive plates). As a result, the typical capacitive moisture sensing field is markedly non-uniform throughout the sensed area as shown. Such field non-uniformity leads to a moisture measurement that is biased more heavily by the grain passing through denser field areas, and can result in sensed grain volume variability depending upon the grain passing over it. In addition, the volume of the grain within the moisture sensing field can vary substantially with grain moisture level due to the moisture level's effect on how far the moisture sensing field radiates into the surrounding grain.

In a typical arrangement shown in FIG. 1, one capacitive plate is insulated from the surrounding grain bin floor, and a portion of the surrounding grain bin floor operates as the other (e.g., ground) capacitive plate. Thus, grain dryer output capacitive moisture sensors typically depend on the moisture sensing field returning at least partially through some adjacent metal of the grain dryer structure (e.g., floor). This implicit or explicit electrical connection to the sensor is accordingly dependent on the quality and variability of that connection through grain dryer metal components. In addition, the metal configuration of the surrounding grain dryer can affect sensor accuracy.

Grain moisture sensors typically assume the sensed area is full of grain, which can lead to low moisture readings when this assumption is incorrect. Capacitive grain moisture sensors also typically rely upon grain temperature measurements taken at the perimeter of the grain volume, and are thus subject to temperature measurement inaccuracy; particularly for capture, hold, and release grain moisture sensors.

SUMMARY

This section provides a general summary of the disclosure, and is not a comprehensive disclosure of its full scope or all of its features.

In accordance with an aspect of the present disclosure, a grain dryer output capacitive moisture sensor assembly can include a main discharge channel structured to carry a main portion of the grain output from a grain dryer during operation of the grain dryer. A sensor channel can be positioned adjacent the main discharge channel and can be structured to carry a sensed portion of the grain output from the grain dryer during operation of the grain dryer. A grain moisture sensor can include a pair of capacitive plates positioned on opposite sides of the sensor channel with opposing major surfaces of the pair of capacitive plates facing each other.

In other aspects, a gate can be movable from a closed position to an open position with respect to an opening of the sensor channel to selectively output a calibration sample of the sensed portion of the grain from the sensor channel through the opening. A calibration sample channel can extend from the opening of the sensor channel and the gate. A sensor control circuit can include a gate position sensor configured to sense each of the open position of the gate and the closed position of the gate. In the open position, the gate can include guide surfaces that are positioned in an interior of the sensor channel and that are configured to guide grain from the interior of the sensor channel out of the opening. In the open position, the guide surfaces can include a first main guide surface that extends at a first angle relative to horizontal and a second main guide surface that is coupled to an interior end of the first main guide surface and that extends at a second angle relative to horizontal in the open position, which second angle is greater that the first angle. In the open position, the guide surfaces can include a main guide surface and peripheral guide surfaces to help retain grain on the main guide surface In other aspects, the opposing major surfaces of the pair of capacitive plates can be oriented vertically and can be positioned in a vertically oriented portion of the sensor channel. An outlet end of the sensor channel can merge into the main discharge channel such that a sensor flow path of the sensor channel exits the sensor channel into a discharge flow path of the main discharge channel. An inlet end of the sensor channel can extend from the main discharge channel such that a sensor flow path of the sensor channel separates from a main discharge flow path of the main discharge channel and flows into the inlet end of the of the sensor channel.

In other aspects, a metering conveyor can be provided in the sensor channel downstream of the grain moisture sensor. The metering conveyor can be a paddle wheel. An inlet end of the metering conveyor can be coupled to a vertical portion of a sensor flow path of the sensor channel. An outlet end of the grain moisture sensor can be directly coupled to an inlet end of the metering conveyor.

In other aspects, the grain moisture sensor including the pair of capacitive plates can be part of a removable sensor unit that forms a portion of the sensor channel. The removable sensor unit can include a grain temperature sensor. The grain temperature sensor can extend into an interior of a sensed volume defined between the pair of capacitive plates to take a grain temperature reading from an interior of the sensed volume. Both of the pair of capacitive plates can be electrically insulated from adjacent metal and dedicated electrical source lines that are electrically insulated from adjacent metal can entirely form an electrical source path that extends from an external electrical power source to the pair of capacitive plates, and the dedicated electrical source lines can entirely form an electric return line that extends from a second of the pair of capacitive plates to the external electrical power source.

In other aspects, each of the opposing major surfaces of the pair of capacitive plates can include a plurality of sub-plates. A pair of the sub-plates at each upper corner of each of the pair of capacitive plates can enable generation of a grain presence electric field across each of the pair of the sub-plates at each upper corner of each of the pair of capacitive plates. A main sub-plate of each of the pair of capacitive plates can enable generation of a moisture sensing electric field between the main sub-plates of the pair of capacitive plates. An upper peripheral sub-plate of each of the pair of capacitive plates can enable generation of an upper sacrificial electric field between the upper peripheral sub-plate of each of the pair of capacitive plates and above the moisture sensing electric field between the main sub-plates of the pair of capacitive plates. A lower peripheral sub-plate of each of the pair of capacitive plates can enable generation of a lower sacrificial electric field between the lower peripheral sub-plate of each of the pair of capacitive plates and below the moisture sensing electric field between the main sub-plates of the pair of capacitive plates. Lateral end peripheral sub-plates of each of the pair of capacitive plates can enable generation of a sacrificial electric field between the lateral end peripheral sub-plates of each of the pair of capacitive plates at each lateral end of the moisture sensing electric field between the main sub-plates of the pair of capacitive plates.

In another aspect of the present disclosure, a grain dryer output capacitive moisture sensing method can include discharging a main portion of a grain dryer grain output from a grain dryer through a main discharge channel during operation of the grain dryer. A sample portion of the grain dryer output can be passed through a sensor channel that is separate from the main discharge channel during operation of the grain dryer. A moisture sensing electric field can be generated through a sensed volume of grain between a pair of capacitive plates of a grain moisture sensor having the pair of capacitive plates positioned on opposite sides of the sensor channel with opposing major surfaces of the pair of capacitive plates facing each other.

In other aspects, the passing a sample portion of the grain dryer output through a sensor channel can include outputting the sample portion from an outlet end of the sensor channel into the main discharge channel. The passing a sample portion of the grain dryer output through a sensor channel can include inputting the sample portion into an inlet end of the sensor channel from the main discharge channel. The passing a sample portion of the grain dryer output through a sensor channel can include passing the sample portion through a vertically oriented portion of the sensor channel between the capacitive plates.

In other aspects, a metering conveyor positioned downstream of the grain moisture sensor in the sensor channel can be rotated at a constant speed. The passing a sample portion of the grain dryer output through a sensor channel can include passing the sample portion from an outlet end of the grain moisture sensor directly into an inlet end of the metering conveyor. The constant speed of the metering conveyor can pass the sample portion through the grain moisture sensor at a grain flow rate that is from 15 bushels per hour to 50 bushels per hour. The constant speed of the metering conveyor, calibration sample removal timing information, and grain moisture reading timing information can be used to correlate grain moisture data collected by the grain moisture sensor with the calibration sample.

In other aspects, a calibration sample can be removed from the sample portion through an opening of the sensor channel that is between an inlet end of the sensor channel and an outlet end of the sensor channel. Removing the calibration sample from the sample portion can include moving a gate from a closed position to an open position relative to the opening of the sensor channel. A gate position sensor can sense when the gate is in the open position to determine calibration sample removal timing information. The calibration sample removal timing information can include a time at which the gate is moved to the open position, and a time at which the gate is moved to the closed position. The calibration sample removal timing information can include a duration of time during which the gate is in the open position. A warning can be displayed if the duration of time is below a predetermined duration. The predetermined duration can be 30 seconds. Calibration sample removal timing information can be matched to corresponding moisture sensor data timing information to identify moisture sensor data that was collected when the calibration sample was present in the sensed volume of the moisture sensor. Information about the moisture sensor data can be displayed without requiring a user to enter a request to display information about the moisture sensor data.

In other aspects, a testing sample can be inputted into a calibration device, which testing sample can be taken from a single calibration sample taken from the sample portion through an opening of the sensor channel such that there is no need to mix multiple calibration samples together between removing the single calibration sample from the sample portion through the opening and inputting the testing sample into the calibration device. A testing sample can be inputted into a calibration device, which testing sample can be taken from a calibration sample taken from the sample portion through an opening of the sensor channel during a single period of time that spans no more than 2 minutes In other aspects, moisture data collected by the grain moisture sensor can be used to adjust drying parameters of the grain dryer. Grain temperature data can be collected from an interior of the sensed volume concurrently with collecting grain moisture data from the sensed volume with the grain moisture sensor. The collecting grain temperature data can be performed at a sampling rate that is at least 1 per 100 ms, and the collecting grain moisture data can be performed at a sampling rate that is at least 1 per 100 ms. The generating a moisture sensing electric field can include generating the moisture sensing electric field having a frequency content that is from 2 MHz to 70 MHz. The generating a moisture sensing electric field can include electrically insulating both of the pair of capacitive plates from adjacent metal and providing electrical power from an external electrical power source to the pair of capacitive plates entirely through dedicated electrical pathways that are electrically insulated from adjacent metal.

In other aspects, a removable sensor unit can be provided that includes the pair of capacitive plates and a sensor box, and the pair of capacitive plates with the sensor box can be removed simultaneously by removing the removable sensor unit. A removable sensor unit can be provided that includes the pair of capacitive plates, a temperature sensor, and a sensor box, and the pair of capacitive plates and the temperature sensor with the sensor box can be removed simultaneously by removing the removable sensor unit. A removable sensor unit can be provided that includes the pair of capacitive plates, an electrical connector, and a sensor box, and wherein the generating a moisture sensing electric field comprises coupling an electrical power source path and an electrical power return path with the capacitive plates by coupling dedicated electrical lines to the electrical connector. The generating a moisture sensing electric field can include coupling an electrical power source path and an electrical power return path with the capacitive plates by coupling dedicated electrical lines to the electrical connector.

In another aspect of the present disclosure, a grain dryer output capacitive moisture sensing method can include generating a moisture sensing electric field between a main sub-plate of a plurality of sub-plates of each of a pair of capacitive plates positioned on opposite sides of a sensor channel with opposing major surfaces of the pair of capacitive plates facing each other. At least one additional electric field can be generated between the plurality of sub-plates of the pair of capacitive plates.

In other aspects, the generating the at least one additional electric field between the plurality of sub-plates of the pair of capacitive plates can include generating a grain presence electric field between a pair of the plurality of sub-plates at each upper corner of each of the pair of capacitive plates. The generating the at least one additional electric field between the plurality of sub-plates of the pair of capacitive plates can include generating an upper sacrificial electric field between an upper peripheral one of the sub-plates of each of the pair of capacitive plates and above the moisture sensing electric field between the main sub-plates of the pair of capacitive plates. The generating the at least one additional electric field between the plurality of sub-plates of the pair of capacitive plates can include generating a lower sacrificial electric field between a lower peripheral one of the sub-plates of each of the pair of capacitive plates and below the moisture sensing electric field between the main sub-plates of the pair of capacitive plates. The generating the at least one additional electric field between the plurality of sub-plates of the pair of capacitive plates can include generating a lateral end sacrificial electric field between a lateral end peripheral one of the sub-plates of each of the pair of capacitive plates at each lateral end of the moisture sensing electric field between the main sub-plates of the pair of capacitive plates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
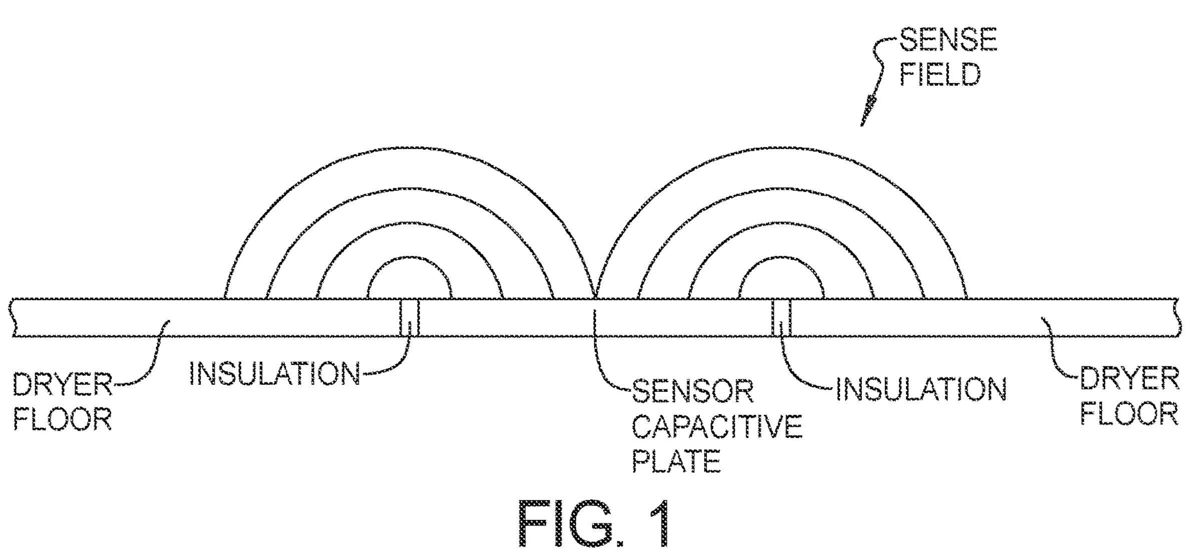
FIG. 1 is an illustration of a typical grain dryer output capacitive moisture sensor in which the capacitive plates are aligned in a common plane.
Figures 2, 3:
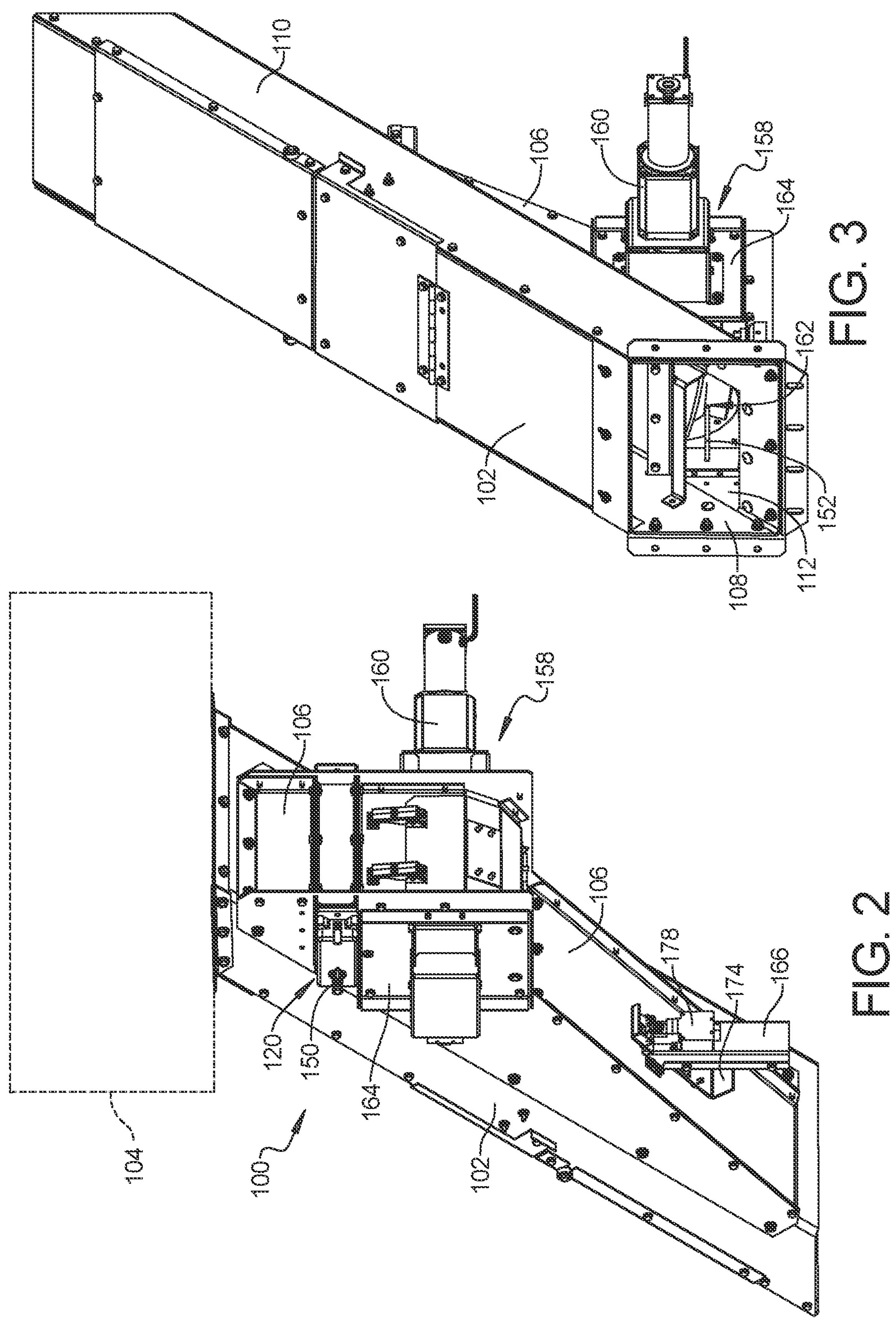
FIG. 2 is a perspective view of one example embodiment of a grain dryer output capacitive moisture sensing assembly in accordance with the present disclosure.
FIG. 3 is a perspective view of the example grain dryer output capacitive moisture sensing assembly of FIG. 2.
Figure 4:
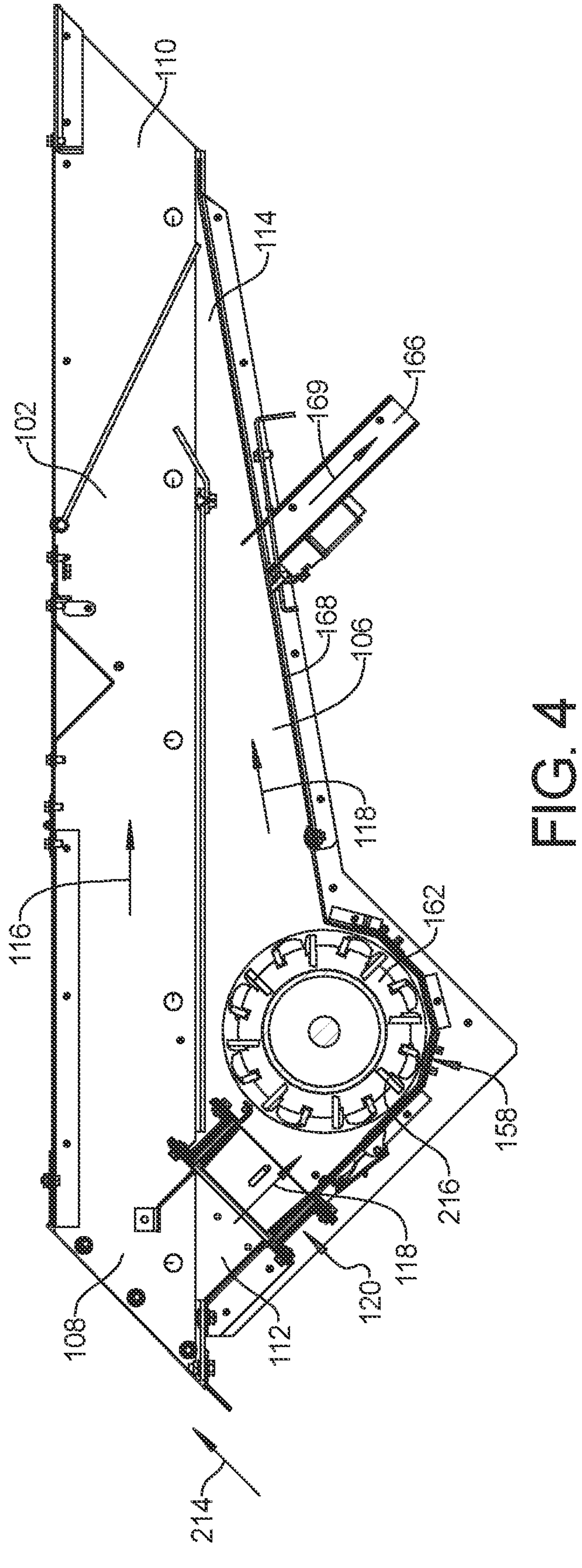
FIG. 4 is a central longitudinal cross-sectional view of the example assembly of FIG. 2.
Figure 5:
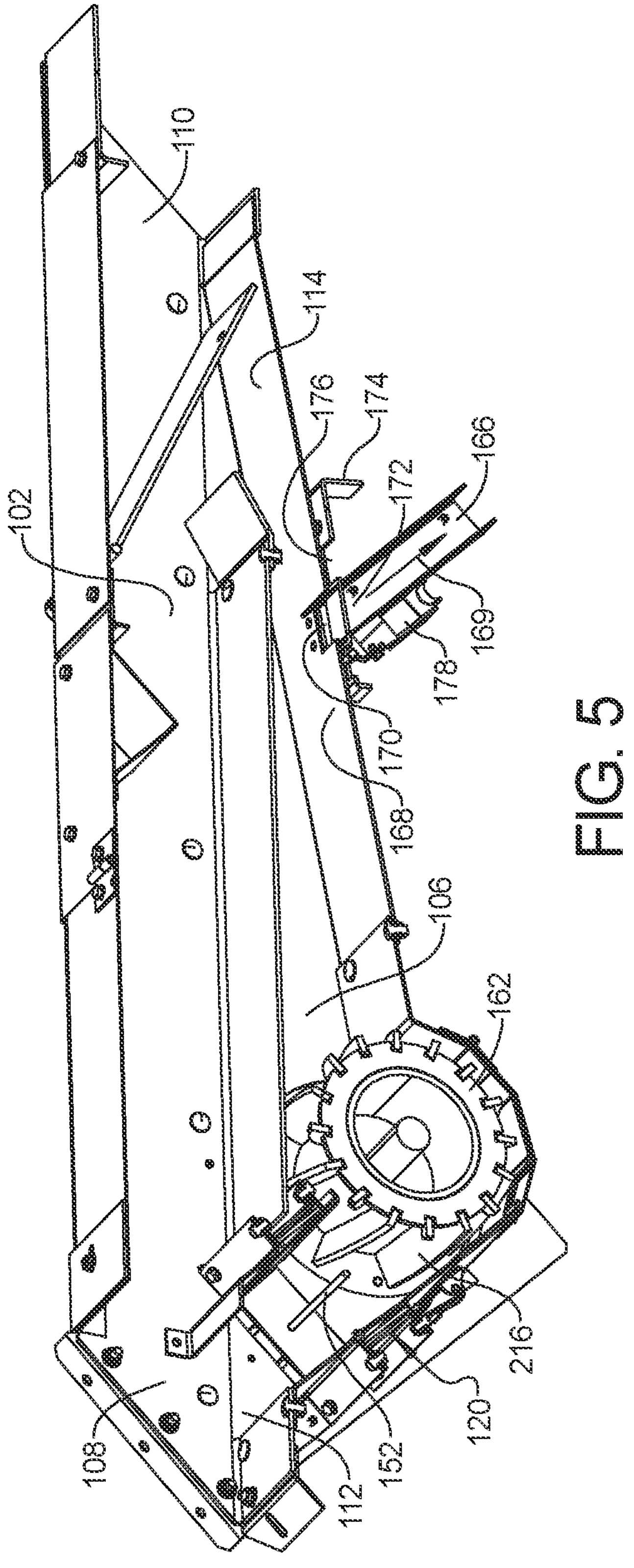
FIG. 5 is a cut-away perspective view of the example assembly of FIG. 2.
Figure 6:
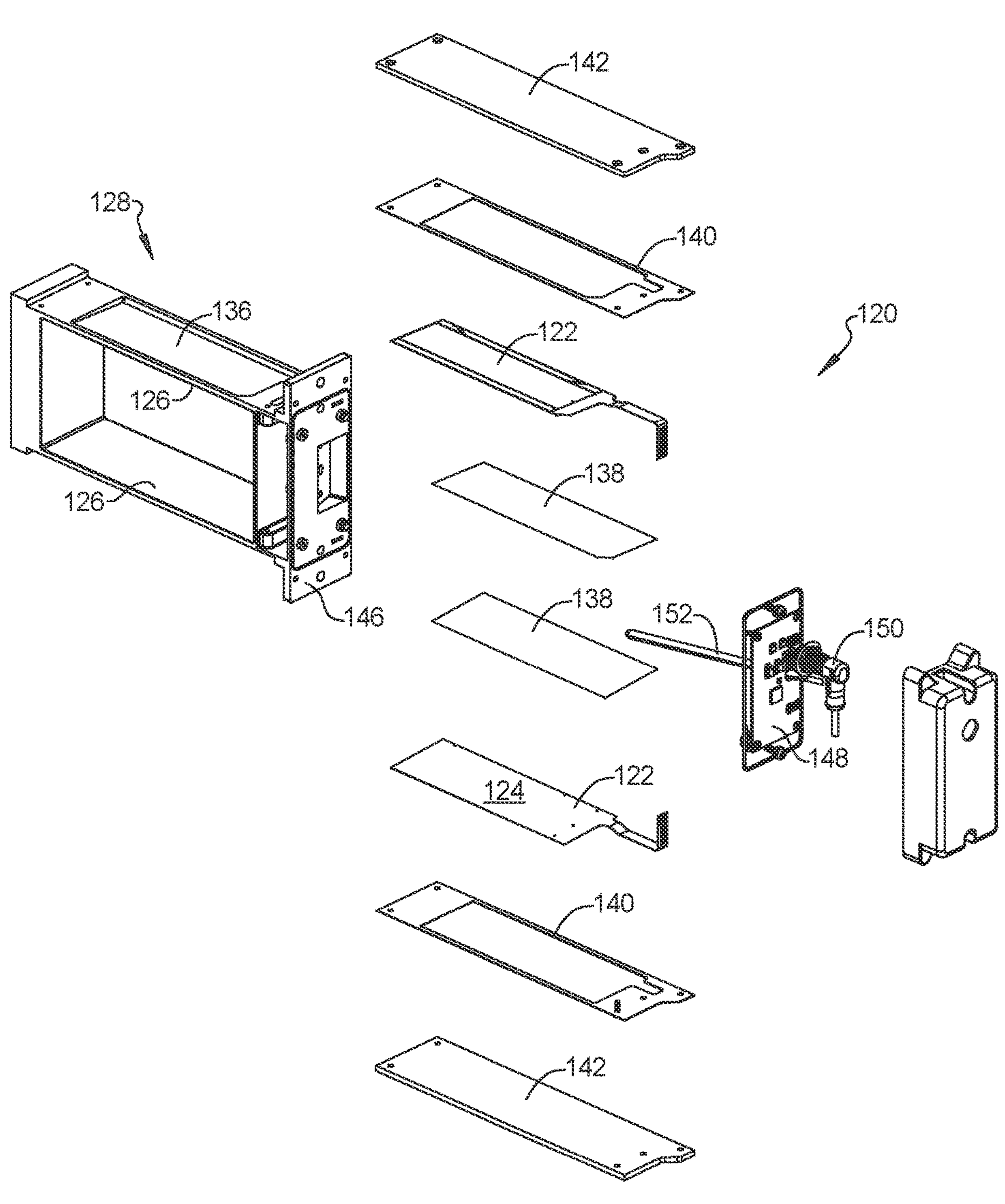
FIG. 6 is an exploded view of the moisture sensor and associated components of the example assembly of FIG. 2.
Figure 7:
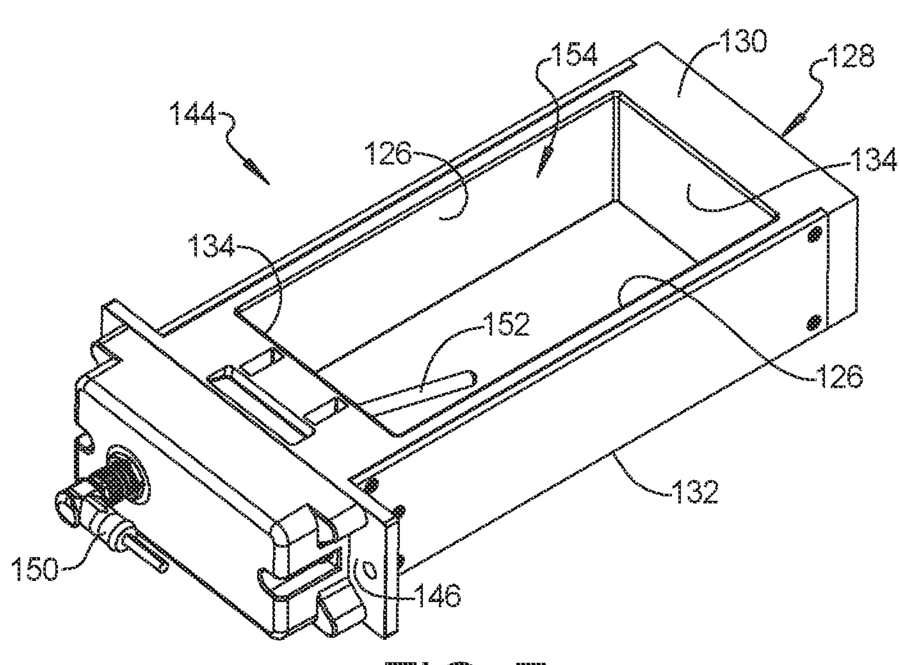
FIG. 7 is a perspective view of the removable moisture sensor unit of the example assembly of FIG. 2.
Figure 8:
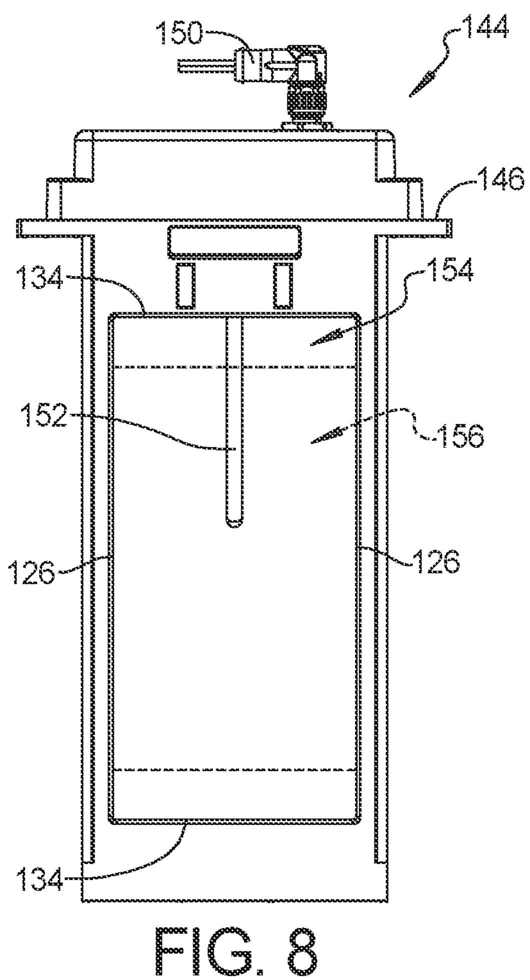
FIG. 8 is a top plan view of the removable moisture sensor unit of FIG. 7.
Figure 9:
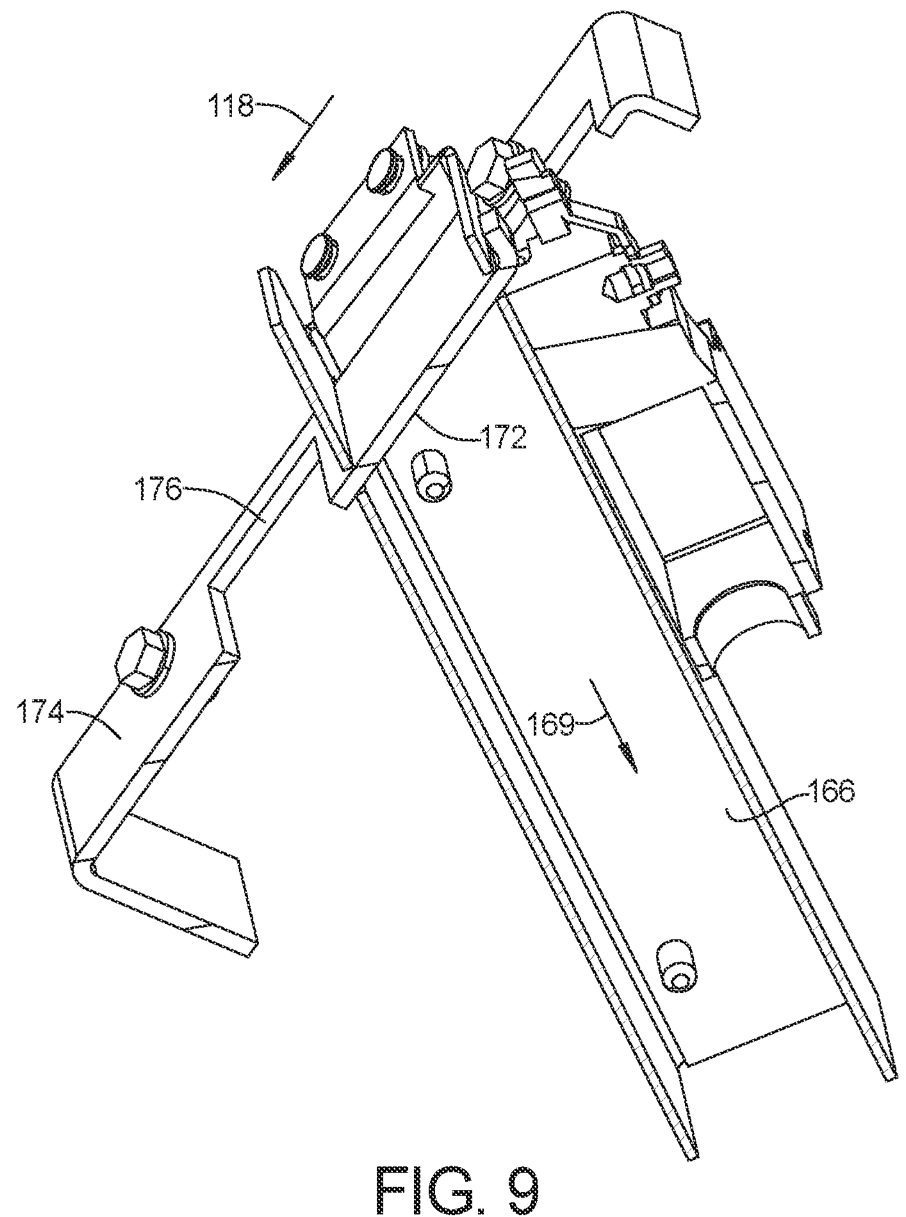
FIG. 9 is a cut-away perspective view of the calibration sample channel and associated components of the example assembly of FIG. 2.
Figure 10:
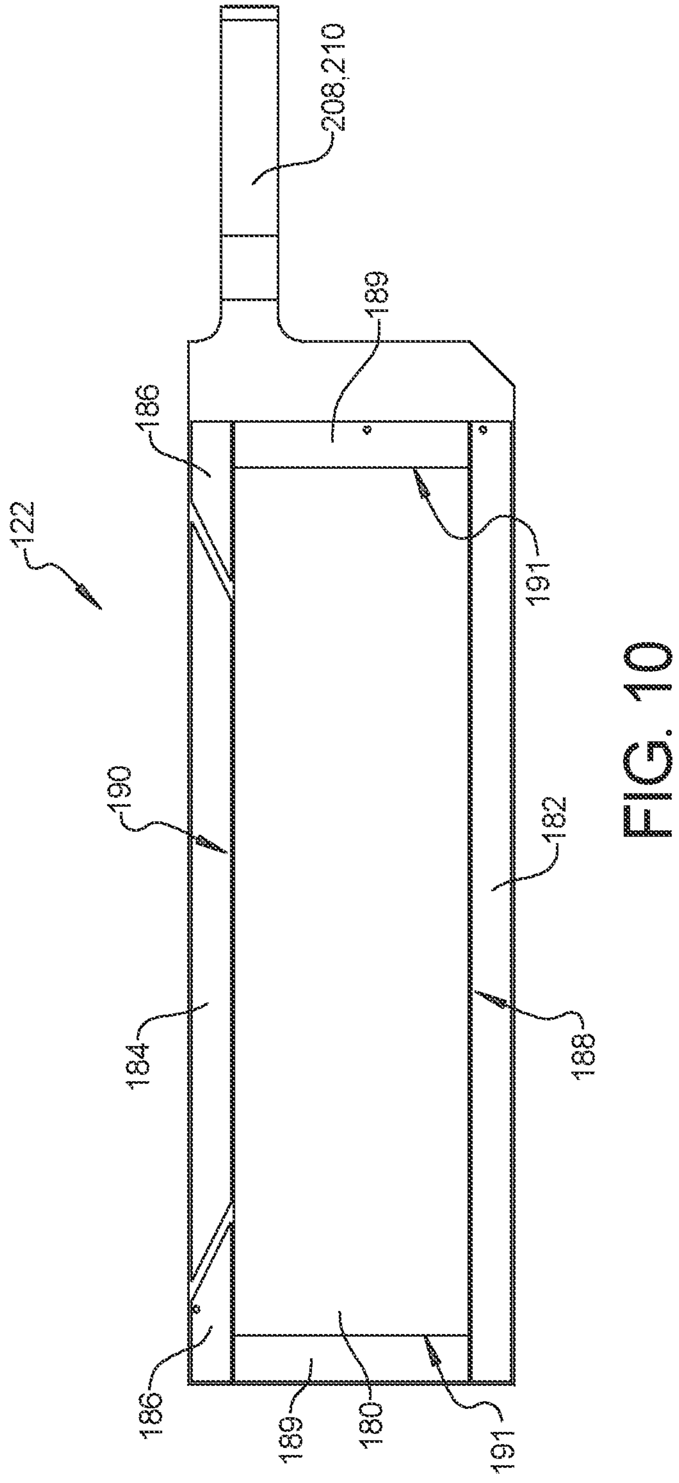
FIG. 10 is a face or side elevation view of a capacitive plate of the moisture sensor of the example assembly of FIG. 2.

Example embodiments will now be described more fully with reference to the accompanying drawings.

FIGS. 2-21 illustrate one example embodiment of a grain dryer output capacitive moisture sensing assembly 100 in accordance with the present disclosure. The assembly 100 can include a main grain discharge channel 102 of the grain dryer 104 and a sensor channel 106. Grain being discharged from the grain dryer 104 can enter into the main discharge channel 102 at an inlet end 108 and can exit at an outlet end 110 thereof.

A portion of the grain being discharged from the grain dryer 104 can enter the sensor channel 106 at an inlet end 112. The sensor channel 106 can have an outlet end 114 through which grain merges into the main discharge channel 102. As in this example, both the inlet end 112 and the outlet end 114 of the sensor channel 106 can be positioned between the inlet end 108 and the outlet end 110 of the main discharge channel 102. Thus, the main discharge channel 102 can define a main grain discharge flow path 116, and the sensor channel 106 can define a grain sensor flow path 118 that separates from and rejoins the main discharge flow path 116 of the assembly 100.

The output moisture sensing assembly 100 can include a capacitive moisture sensor 120 that includes two parallel capacitive plates 122. The two capacitive plates 122 can have major surfaces 124 that are arranged parallel to and opposing each other, and uniformly spaced from each other at a predetermined distance. Such opposing major surfaces 124 of the capacitive plates 122 can be arranged in complete alignment with each other. The capacitive plates 122 can be positioned along two opposite side walls 126 of the sensor channel 106. The parallel capacitive plates 122 and the two opposite side walls 126 can be vertically oriented or aligned. The two remaining opposite side walls 134 extending between the capacitive plates 122 can also be vertically oriented or aligned. Thus, the sensor channel 106 through and adjacent the moisture sensor 120 can form a completely vertical grain flow path 118. This can reduce the possibility of turbulent grain flow that could result in the accumulation of grain pockets or fines in the area of the moisture sensor 120. Such accumulation of grain pockets or fines could negatively affect the accuracy of its moisture readings.

As in the illustrated example, the capacitive plates 122 can be mounted to two opposite side walls 126 of a rectangular sensor box 128 that is open both on an inlet, upstream, or top side 130 and on an outlet, downstream, or bottom side 132. Thus the two opposite side walls 126 can form either or both of opposite side walls of the sensor box 128, and portions of opposite side walls of the sensor channel 106. The remaining two opposite side walls 134 of the sensor box 128 can essentially define the predetermined distance between the capacitive plates 122. The remaining two opposite side walls of the sensor box 128 can form the rest of the portion of the sensor channel 106.

The capacitive plates 122 can be mounted in outer recesses 136 in the two opposite side walls 126 of the sensor box 128. The capacitive plates 122 can be sandwiched between or covered by one or more electrical insulation layers 138, gaskets or seal layers 140, and protection or cover layers 142.

A portion of the sensor channel 106 can house a known or fixed grain sample volume 154 that can be provided within the sensor box 128. For example, this fixed grain sample volume 154 can essentially correspond to the interior volume of the sensor box 128 between the opposite side wall pairs 126, 134 and between its top side 130 and its bottom side 132. The sensed volume 156 through which the capacitive field passes during grain moisture measurement can encompass the entirety of the grain sample volume 154, or somewhat beyond. As in this example, the sensed volume 156 can be smaller than the sample volume 154 and this sensed volume 156 can be positioned wholly within the grain sample volume 154. For example, the sensed volume 156 can essentially correspond to the volume of the grain within the sample volume 154 that is positioned in the rectangular cuboid space between the main sub-plates 180 of the capacitive plates 122.

The sensor box 128 and capacitive plates 122 can form a removable sensor unit 144. The removable sensor unit 144 can be configured as a bottomless drawer unit 144 that can be slid into a corresponding drawer recess of the sensor channel 106. The bottomless drawer unit 144 can include a drawer face 146. The removable sensor unit 144 can include a circuit board 148 that can include a sensor controller or control circuit 194 and the circuit board 148 can be mounted to the drawer face 146. For example, the sensor controller or sensor control circuit 194 can include a microprocessor 196 and memory 198. The drawer face 146 of the removable sensor unit 144 can include a sealing electrical coupling 150, such as a screw on pin coupling. Sensor data can be transmitted to and from the sensor controller 194 via a data transceiver 202. Electrical power from a power source 200 and sensor data can be transmitted over electrical lines coupled to the sensor control circuit 194 of the circuit board 148 of the sensor unit 144 via the sealing electrical coupling 150. Alternatively, the data transceiver 202 can rely on wireless communication. The sensor control circuit 194 of the circuit board 148 that is physically incorporated into the sensor unit 144 can communicate with a dryer system controller or dryer system control circuit 218. Alternatively, all or part of the sensor control circuit 194 can be physically incorporated into a dryer system control circuit 218.

Each of the capacitive plates 122 can be wired to the electrical power source 200 through dedicated electrical lines or wires. In other words, neither the capacitive plates 122 nor any other electrical connections with the capacitive plates 122 include any electrical pathway flowing through any metal components of the grain dryer 104 per se, such as the metal, floors, walls, channels of the grain dryer 104. As in this example, electrical power source path 208 to, and the electrical return path 210 from the capacitive plates 122 that is controlled by or that passes through the sensor control circuit 194 can be completely contained within the removable sensor unit 144. Similarly, any external electrical power source and return paths can likewise be provided through dedicated electrical lines that can be coupled to the removable sensor unit 144 via its electrical coupling 150.

The output moisture sensing assembly 100 can include a temperature sensor 152. The removable sensor unit 144 can include the temperature sensor 152. The temperature sensor 152 can extend into the sample volume 154 and into the sensed volume 156. In this way, both the temperature and moisture level of the same grain sample within the sensed volume 156 can be measured together in space and time. Alternatively, the temperature sensor 152 can be positioned within the sensor channel 106, and can be positioned adjacent the sample volume 154.

The output moisture sensing assembly 100 can include a grain metering conveyor 158 in the sensor channel 106. As in this example, the metering conveyor 158 can be located in the sensor channel 106 between the capacitive moisture sensor 120 and the outlet end 114 of the sensor channel 106. In other words, the metering conveyor 158 can be positioned in the sensor channel 106 downstream of the moisture sensor 120 and upstream of the outlet end 114 of the sensor channel 106.

As in this example, the metering conveyor 158 can comprise a motor 160 and a paddle wheel 162. The motor 160 can be operated to continuously rotate the paddle wheel 162 at a constant, uniform speed during moisture sensing operations. In some cases, the constant, uniform, speed of the paddle wheel 162 can be at least 2 RPM, at least 5 RPM or at least 11 RPM. In some cases, the constant, uniform, speed of the paddle wheel 162 can be up to 36 RPM, up to 16 RPM or up to 10 RPM. The paddle wheel or grain propeller 162 of the metering conveyor 158 can be housed within the sensor channel 106 between two opposite removable panels 164 to facilitate maintenance and replacement of the metering conveyor 158. As in this example, the motor 160 and paddle wheel 162 can be supported, in whole or in part, by the two opposite removable panels 164.

The grain flow speed or the flow rate of the grain through the moisture sensor 120 or sensor channel 106 can be high enough to minimize sweat on the grain, and the accumulation of moisture or grain fines in the vicinity of the moisture sensor 120, such as in or around the grain sample volume 154 and the sensed volume 156. Such accumulation of moisture or grain fines could negatively affect the accuracy of the moisture readings taken by the moisture sensor 120. In some cases, the metering conveyor 158 can be operable to provide a grain flow rate in the sensor channel 106 passing through the moisture sensor 120 that can be at least 15 bushels/hour, at least 25 bushels/hour, or at least 30 bushels/hour.

The grain flow speed or the flow rate of the grain through the moisture sensor 120 or sensor channel 106 can be low enough to facilitate a constant pack or grain density in the area of the moister sensor 120. Such consistent grain pack or density in the grain sample volume 154 and the sensed volume 156, which can improve the accuracy of the moisture readings. In some cases, the constant, uniform, speed of the paddle wheel 162 can be operable to provide a grain flow rate in the sensor channel 106 passing through the moisture sensor 120 that can be up to 100 bushels/hour, up to 50 bushels/hour, or up to 30 bushels/hour.

The grain dryer system control circuit 218 can be configured to control the operation of the metering conveyor 158, including being configured to control the paddle wheel 162 RPM's and grain flow rates as indicated above. As examples, the metering conveyor 158 can be coupled to the dryer system control circuit 218 via the electrical coupling 150 or wirelessly. The dryer system control circuit 218 can include a circuit board 226 that can include a microprocessor 220, memory 222, and a transceiver 224. The dryer system control circuit 218 can be coupled to and configured to control operation of a grain dryer fan 228, a grain dryer heater 230, and a grain dryer conveyor 232. The grain dryer conveyor 232 can be configured to move grain toward and into the inlet ends 108, 112 of the main discharge channel 102 and grain sensor flow path 118, respectively. The grain dryer system control circuit 218 can also be coupled to a gate position sensor 178, and to input/output devices, such as a display screen 234 and keypad 236, which can be integrated together as a touch screen.

The output moisture sensing assembly 100 can include a calibration sample channel 166. The calibration sample channel 166 can define a calibration flow path 169 by which a calibration sample of the grain, on which the moisture sensor 120 has taken a reading, can be selectively removed from of the sensor channel 106 to have its moisture content measured read by a separate reference moisture sensor (not shown) for use in confirming and calibrating the accuracy of the capacitive moisture sensor 120 of the output moisture sensing assembly 100.

The calibration sample channel 166 can extend from a side wall (e.g., a bottom side wall) 168 of the sensor channel 106. For example, the side wall 168 of the sensor channel 106 can have an opening 170 therethrough that forms the inlet end 172 of the calibration sample channel 166. The opening 170 in the sensor side wall 168 and inlet end 172 can be positioned along the sensor channel 106 between the moisture sensor 120 and the outlet end 114 thereof. A gate 174 can operate to open and close this opening 170 at the inlet end 172 of the calibration sample channel 166.

As in this embodiment, the gate 174 can be slid between an open position in which an opening 176 through the gate 174 is aligned with the sensor channel opening 170, and a closed position in which these two openings 170 and 176 are not aligned, so that the gate 174 covers and closes the sensor channel opening 170. The gate position sensor 178 can be provided to sense when the gate 174 is in the open position, so that the calibration sample taken from the calibration sample channel 166 can be coordinated with the timing at which the calibration sample being discharged was present in the sample volume 154 or sensed volume 156 and had its moisture data collected by the moisture sensor 120. The constant uniform flow rate along the sensor channel 106 that is provided by the metering conveyor 158 can facilitate this matching of sensor data previously collected and stored in the memory 198 or memory 222 along with time stamp information with calibration samples collected through the calibration sample channel 166.

For example, the grain dryer system control circuit 218 can be coupled to the gate position sensor 178 to receive inputs therefrom. The grain dryer system control circuit 218 can be configured to identify the time at which a calibration sample being discharged was present in the sample volume 154 or sensed volume 156 based on inputs from the gate position sensor 178, and to use the identified time to further identify the corresponding moisture data collected by the moisture sensor 120 at that time and stored in memory 202, or 198. The grain dryer system control circuit 218 can be configured to display this corresponding moisture data on the display screen 234, automatically or in response to user inputs via the keypad 236. This can enable a user to compare the moisture data obtained by testing the calibration sample using a separate calibration device (not shown) with the corresponding moisture data stored in memory 222 or 198.

The grain dryer system control circuit 218 can be configured to receive the moisture data obtained from the calibration sample from a user via the keypad 236 and to adjust operation of grain dryer components based on a comparison of the moisture data from the moisture sensor 120 with the corresponding moisture data from the calibration sample to better achieve a desired target moisture content. For example, the grain dryer system control circuit 218 can be configured to adjust operation of the heater 230, fan 228, and any grain dryer conveyor 232, to adjust the conversion of inputs received from the moisture sensor 120 to the grain moisture content data stored and used by the sensor control circuit 194 or by the grain dryer system control circuit 218, or to otherwise adjust the data stored in the memory 222 or 198 of the grain dryer system control circuit 218. The grain dryer system control circuit 218 can be configured to make such adjustments based on data comparisons from a single calibration sample, or based on a series of data comparisons that each relate to one in a corresponding series of calibration samples taken over time.

The capacitive plates 122 can comprise multiple sub-plates that are electrically insulated or isolated from each other and can be separately addressed or activated. For example, each of the capacitive plates 122 can include a central, main, or major sub-plate 180 and one of more peripheral sub-plates 182, 184, 186, 189, that can extend along the lower side, edge or periphery 188 and along the upper side, edge or periphery 190 of the major sub-plate 180, and along each lateral or end side, edge or periphery 191 of the major sub-plate 180. The lower peripheral sub-plate 182 can span the full length of the lower edge 188 of the major sub-plate 180. The full length of the upper edge 190 of the major sub-plate 180 can be spanned by a middle sub-plate 184 between a pair of end sub-plates 186. The upper sub-plates 184, 186 and the lower sub-plate 182 can form the upper and lower peripheral edges or bands, respectively, the major sub-plate 180 can form a central portion or band of each of the capacitive plates 122. The end sub-plates 189 can form lateral or end peripheral bands that can extend longitudinally traverse to the other bands.

Figure 11:
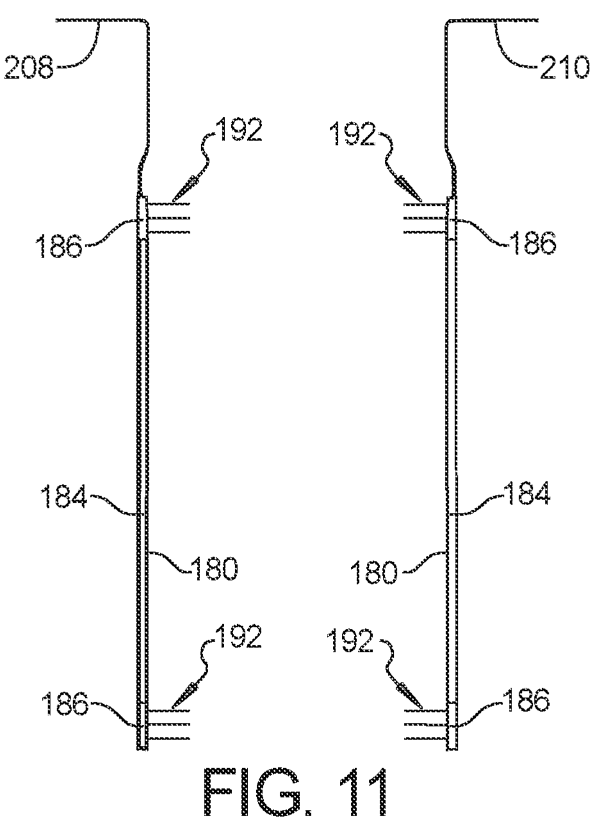
FIGS. 11 and 12 are a top plan view and an end elevation view, respectively, illustrating example grain presence sense fields that can be generated by the capacitive plates of the example assembly of FIG. 2.
Figure 12:
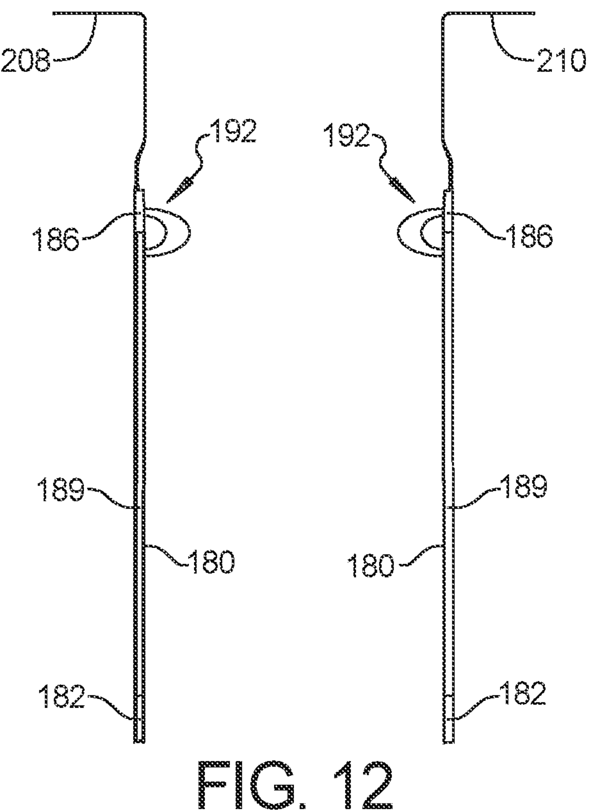
Figure 13:
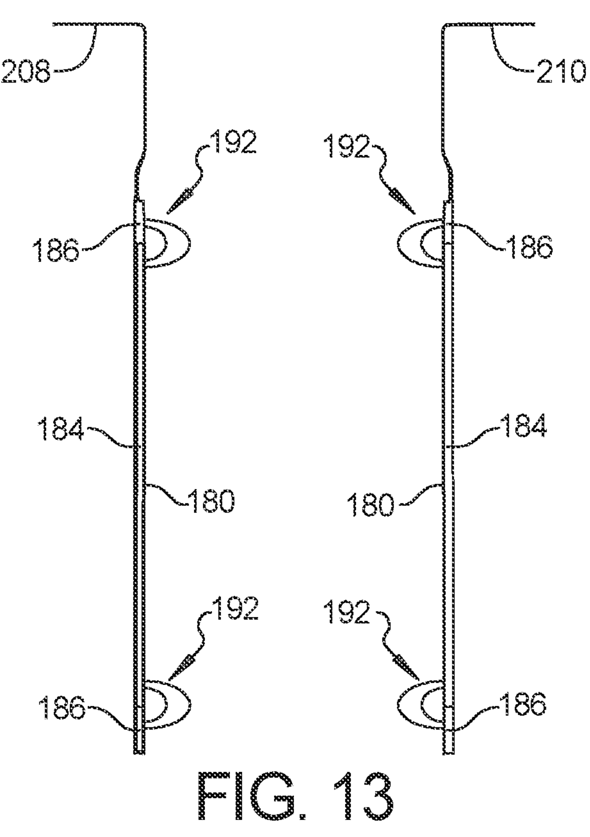
FIGS. 13 and 14 are a top plan view and an end elevation view, respectively, illustrating alternative example grain presence sense fields that can be generated by the capacitive plates of the example assembly of FIG. 2.
Figure 14:
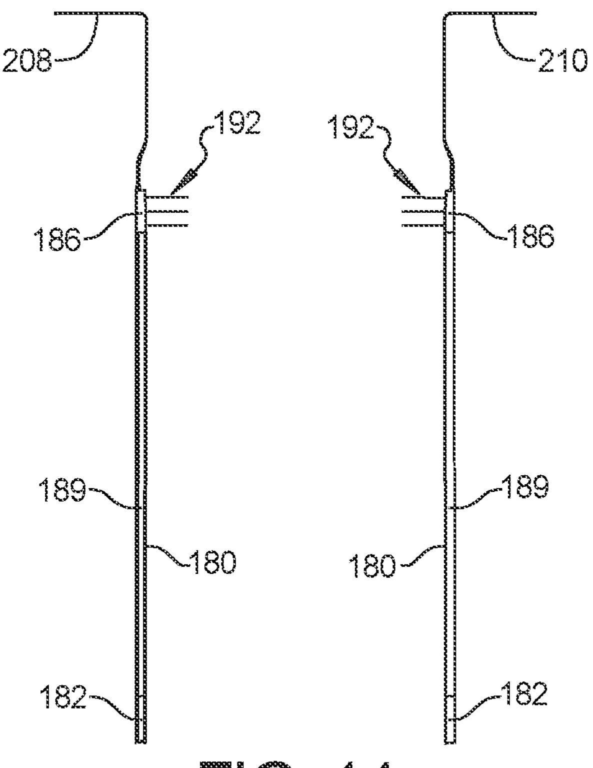
Figure 15:
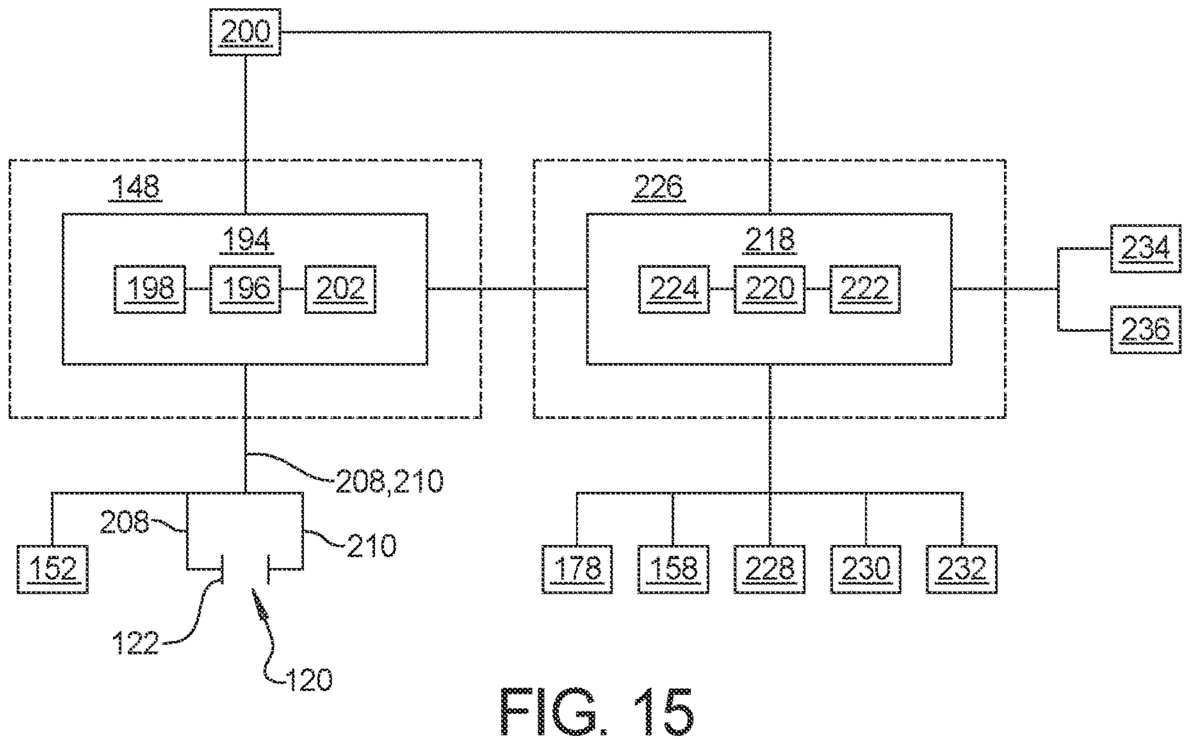
FIG. 15 is a circuit illustration including the moisture sensor control circuit and a grain dryer system control circuit of the example assembly of FIG. 2.

Prior to the moisture sensor 120 taking a moisture reading, an electric field can be generated across adjacent sub-plates. For example, a grain presence electric field 192 can be generated across each of the end sub-plates 186 and the major sub-plate 180 as illustrated in FIGS. 11 and 12. Thus, an electric field 192 can be formed near each of the four upper corners of the sample volume. Data from these four sub-capacitor electric fields can be used to determine whether grain is present at all four corners, indicating sensed volume 156 is completely full of grain, or indicating some reduced level of grain is present. This information can be used to appropriately adjust moisture readings to account for any volumetric grain variance within the sample volume 154 or sensed volume 156, or discount the associated moisture reading data. Alternatively, similar grain presence sensing electric fields 192 can be formed near each of the four upper corners of the sample volume 154 by generating electric fields across the middle sub-plate 184 and each adjacent end sub-plate 186 of each capacitive plate 122 as illustrated in FIGS. 13 and 14.

Figure 16:
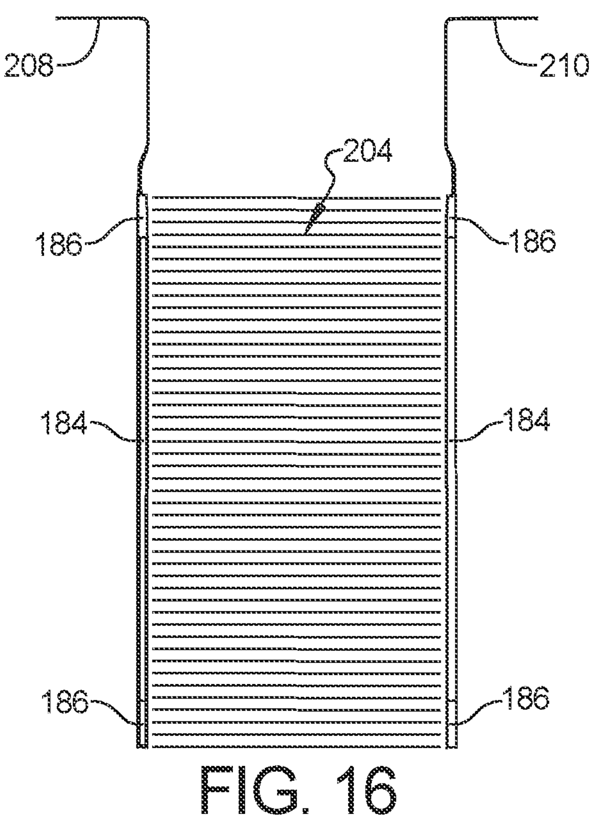
FIGS. 16 and 17 are a top plan view and an end elevation view, respectively, illustrating example upper and lower protective, shielding, or sacrificial fields that can be generated by the capacitive plates of the example assembly of FIG. 2.
Figure 17:
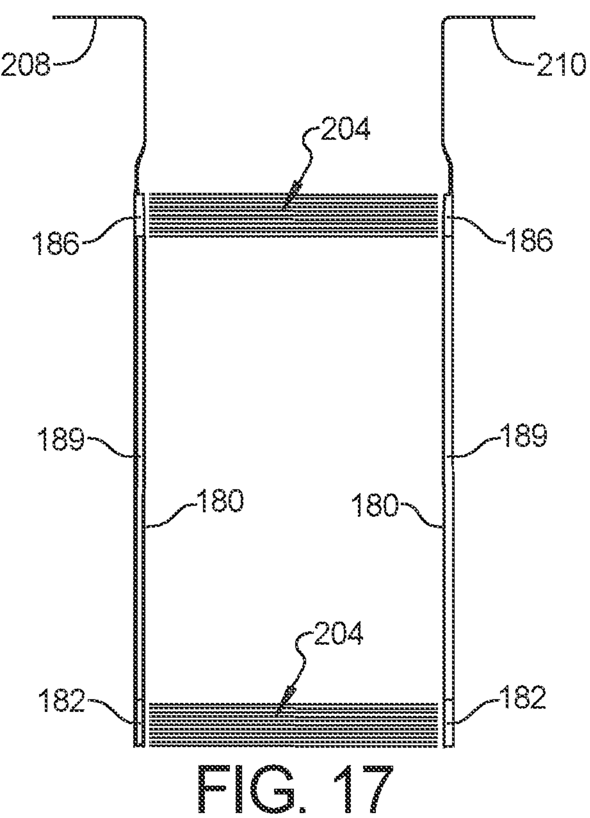

An upper and a lower protective, shielding, or sacrificial field 204 can be generated to shield a moisture sensing or main electric field 206 from outside electrical influences while the moisture sensor 120 makes a grain moisture reading. For example, an upper sacrificial electrical field 204 can be generated across the upper sub-plates 184, 186 of one capacitive plate 122, and the parallel sub-plates 184, 186 of the other capacitive plate 122 as shown in FIGS. 16 and 17. Alternatively or additionally, a lower sacrificial electric field 204 can be generated across the lower sub-plates 182 as further shown in FIGS. 16 and 17. Data related to these upper and lower sacrificial fields 204 are not used by the moisture sensor 120 to determine the moisture level of the grain.

Figures 18, 19:
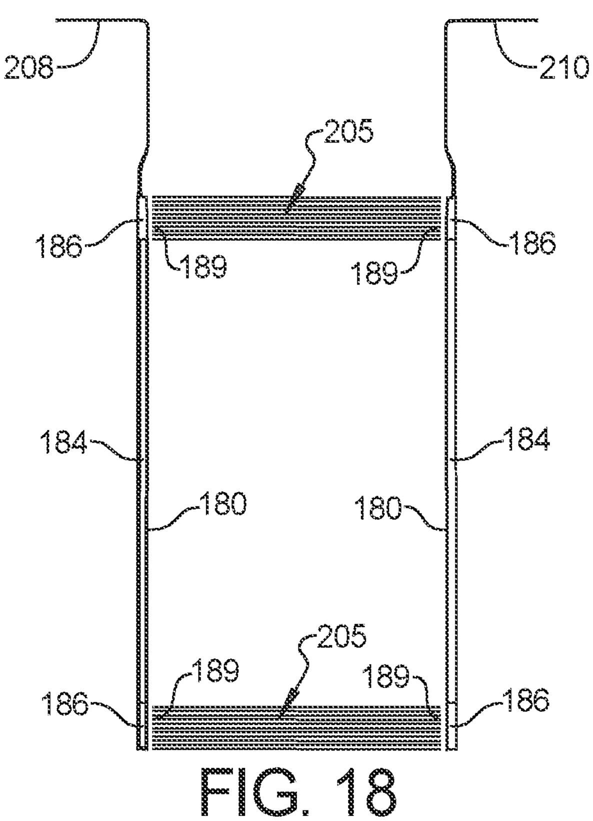
FIGS. 18 and 19 are a top plan view and an end elevation view, respectively, illustrating example end or side protective, shielding, or sacrificial fields that can be generated by the capacitive plates of the example assembly of FIG. 2.

A lateral or end protective, shielding, or sacrificial field 205 can be generated across one or both of the lateral or side ends of the opposing capacitive plates 122 to shield the moisture sensing or main electric field 206 from outside electrical influences while the moisture sensor 120 makes a grain moisture reading. For example, an end or lateral sacrificial electrical field 205 can be generated across each of the end sub-plates 189 of one capacitive plate 122, and the corresponding or opposite end sub-plate 189 of the other capacitive plate 122 as shown in FIGS. 18 and 19.

Figure 20:
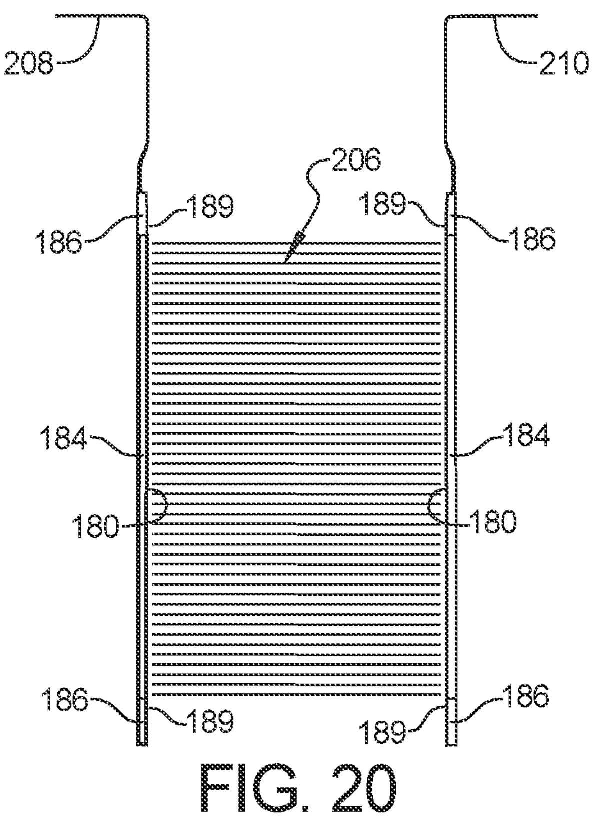
FIGS. 20 and 21 are a top plan view and an end elevation view, respectively, separately illustrating the moisture sensing or main electric field that can be generated by the capacitive plates of the example assembly of FIG. 2.
Figure 21:
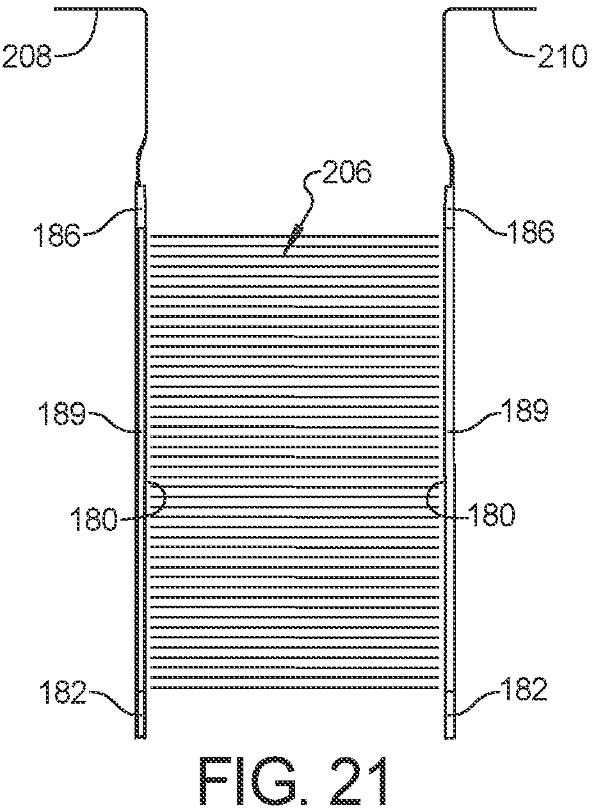
Figure 22:
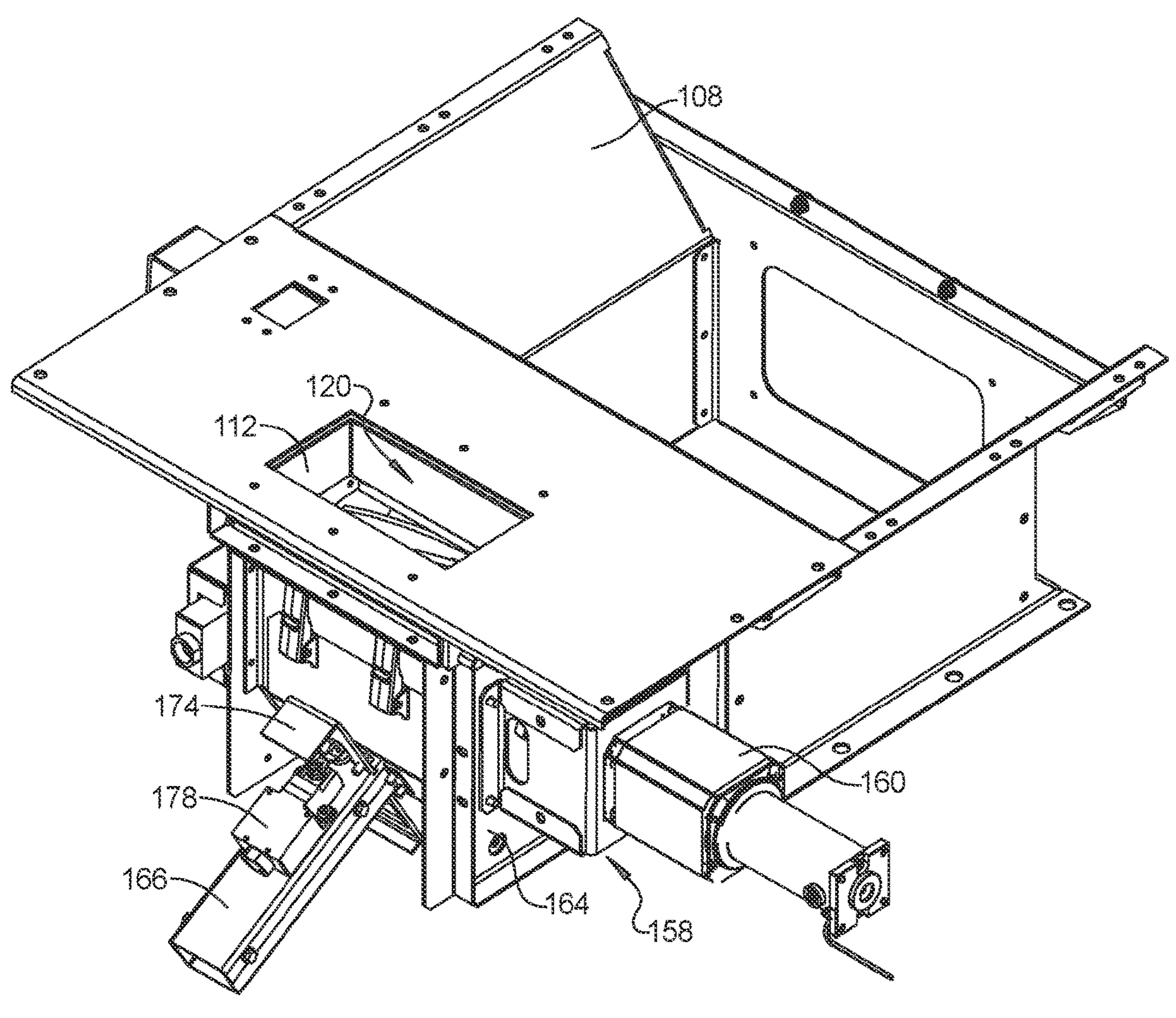
FIG. 22 is a perspective view of another example embodiment of a grain dryer output capacitive moisture sensing assembly in accordance with the present disclosure.
Figure 23:
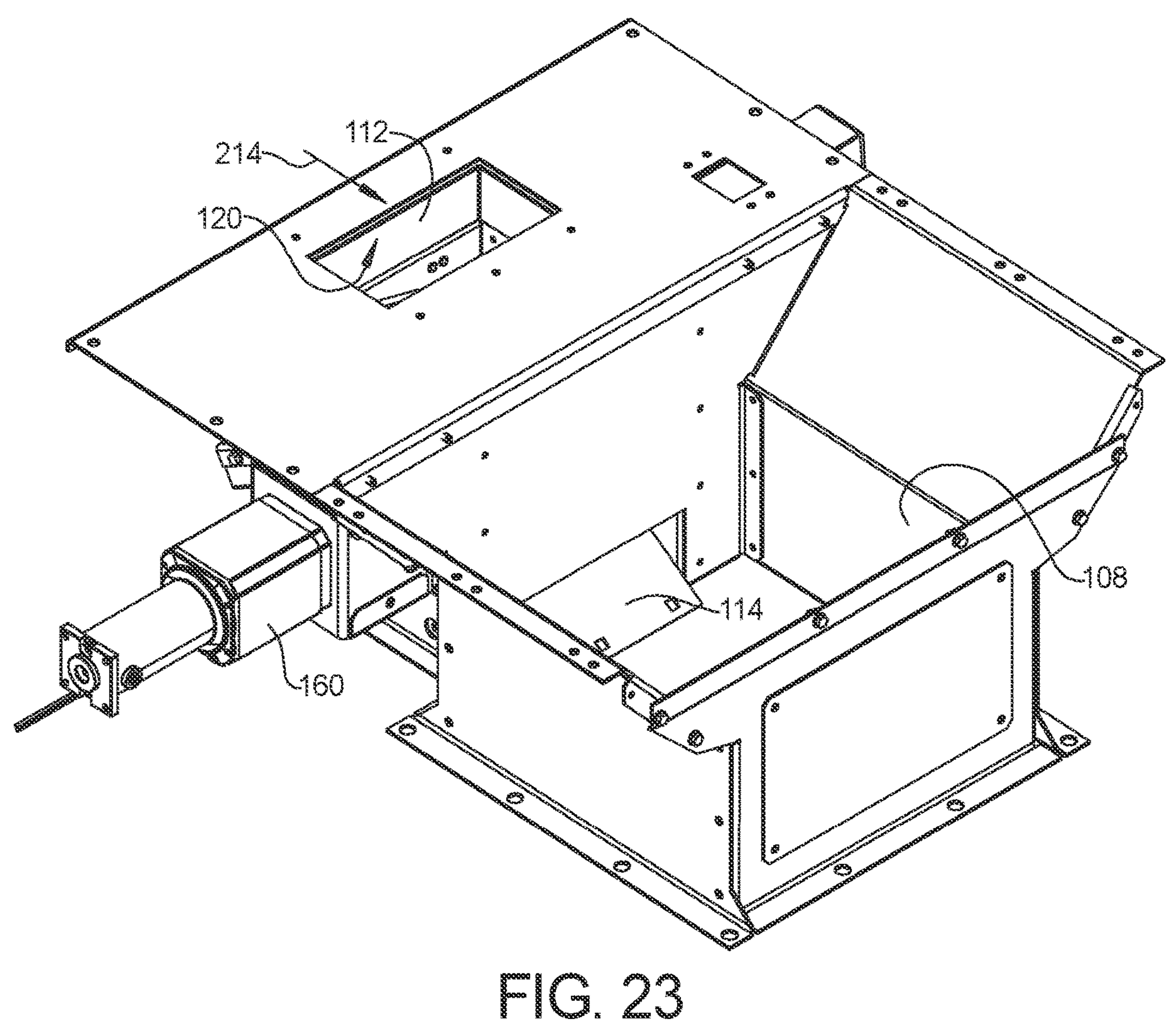
FIG. 23 is a perspective view of the example grain dryer output capacitive moisture sensing assembly of FIG. 22.
Figure 24:
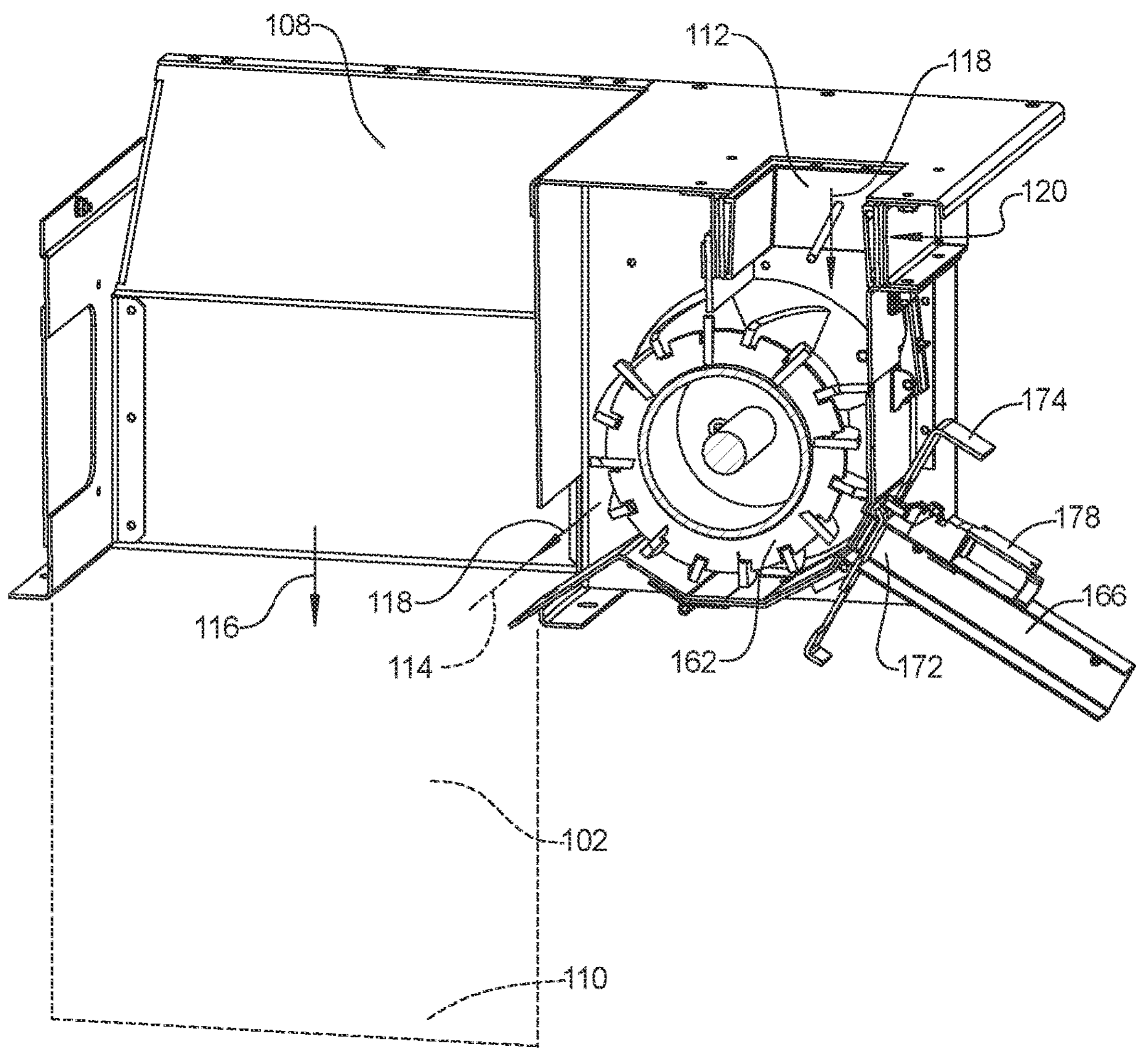
FIG. 24 is a cut-away perspective view of the example assembly of FIG. 22.
Figure 25:
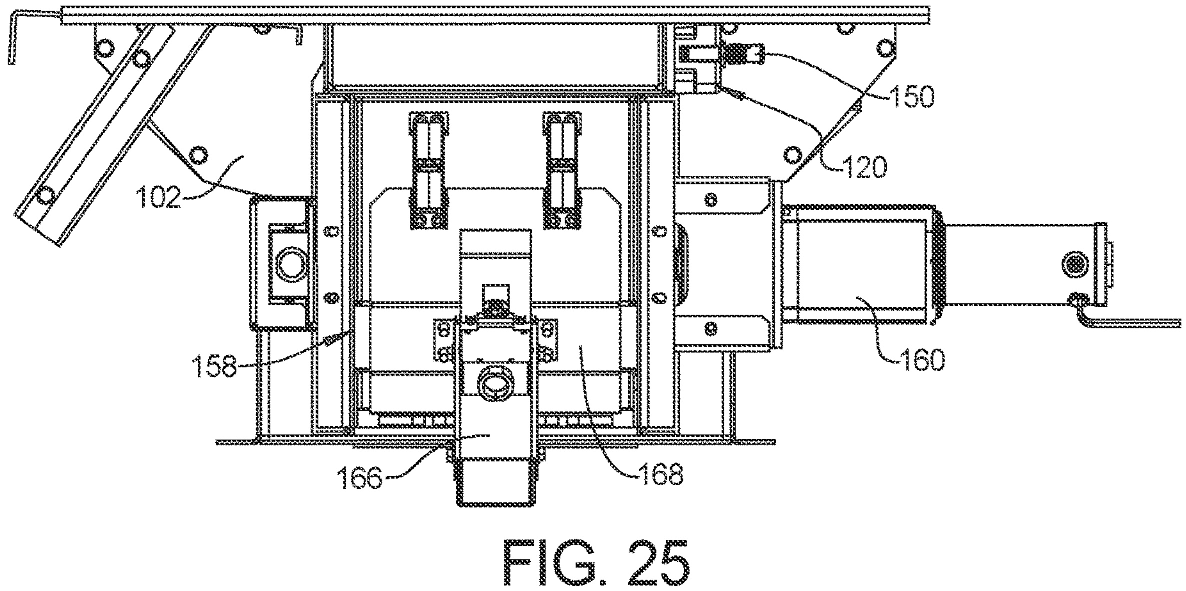
FIG. 25 is a side elevation view of the example assembly of FIG. 22.

The main or moisture sensing electrical field 206 can be generated between the parallel capacitive plates 122 of the moisture sensor 120. For example, the moisture sensing electric field 206 can be generated across the parallel central, major or moisture sensing sub-plates 180 of the capacitive plates 122 as shown in FIGS. 20 and 21. Although the sacrificial or protective fields 204 and the moisture sensing electrical field 206 are illustrated in separate drawings for clarity, it should be appreciated that both the protective electrical fields 204 and moisture sensing electric field 206 are generated or active while the moisture sensor 120 is collecting moisture sensing data for a grain moisture level or content determination.

The main, moisture measurement, or moisture sensing field 206 can be generated by parallel aligned capacitive plates, and can be a much more uniform electric field as illustrated in FIGS. 20 and 21, as compared to the electric field generated by the coplanar or adjacent capacitive plates that are typical of current grain dryer output capacitive moisture sensors, and as illustrated in FIG. 1. This helps increase the accuracy and consistency of moisture sensor readings, particularly in combination with the consistent grain density within the known sample volume 154 of the moisture sensor 120 as discussed above.

The sensor control circuit 194 can be programmed or otherwise configured to generate a moisture sensing field 206 across the moisture sensing capacitive sub-plates 180 of the parallel spaced capacitive plates 122 that has a frequency content that is much higher than typical grain moisture sensors. A moisture sensing field 206 having such a meaningfully higher frequency content can provide for greater grain penetration and reduced sensitivity to conductivity effects, resulting in greater accuracy in grain moisture sensing. In some cases for example, the frequency content of any of the moisture sensing field 206, the sacrificial fields 204, 205, and the grain presence fields 192 can be any of at least 2 MHz, at least 3 MHz, at least 4 MHz, and at least 5 MHz. In some cases for example, the frequency content of the moisture sensing field 206 can be any of up to 70 MHz, up to 60 MHz, up to 50 MHz, and up to 40 MHz.

The sensor control circuit 194 can be programmed or otherwise configured to have a data collection or sampling rate when measuring grain moisture content that is much higher than that of typical grain moisture sensors. Such a high data sampling rate can facilitate sensor or data diagnostics of the moisture sensor 120, including identification of outlier data. For example, it can be inferred that certain outlier data is likely the result of debris being present in the sample volume 154 or sensor volume 156 when the moisture reading resulting in the outlier data was taken. For example, in some cases the sampling rate of each of the temperature sensor 152, and the capacitive moisture sensor 120, can be any of at least 1 per 100 ms, at least 1 per 50 ms, at least 1 per 30 ms, at least 1 per 20 ms, and at least 1 per 15 ms. These correspond to a combined sampling rate of both the capacitive moisture sensor 120 and the temperature sensor that is any of at least 2 per 100 ms, at least 2 per 50 ms, at least 2 per 30 ms, at least 2 per 20 ms, and at least 2 per 15 ms, respectively.

Figure 26:
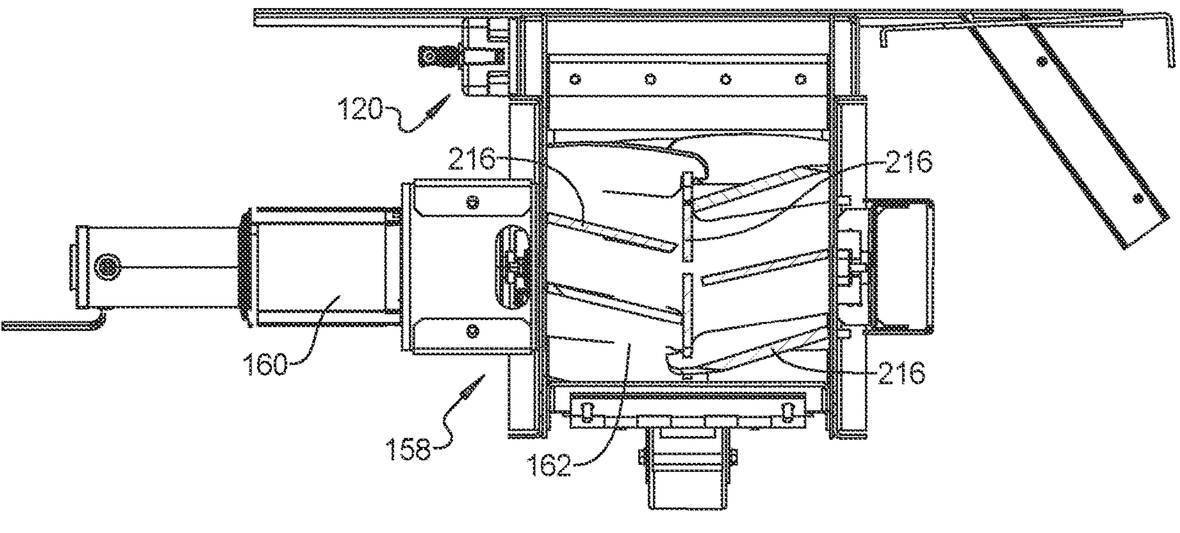
FIG. 26 is a cut-away side elevation view of the example assembly of FIG. 22.

FIGS. 22-26 illustrate another example embodiment of a grain dryer output capacitive moisture sensing assembly 100 in accordance with the present disclosure. The same reference numbers are used herein to identify and describe corresponding elements or features in each of the various example embodiments of this disclosure, even if the corresponding elements or features are not identical. In addition, the descriptions and drawings of various corresponding elements or features previously provided may not be duplicated herein, despite its applicability to the other example embodiments, to reduce or avoid unnecessary repetition thereof and vice versa. For example, FIGS. 6-21 and the related discussion are equally applicable to this embodiment, just as the vanes or paddles 216 illustrated in FIG. 26 are equally applicable to the prior embodiment.

The grain dryer output capacitive moisture sensing assembly 100 can include a main discharge channel 102 of the grain dryer 104 and a sensor channel 106. As in this example, the sensor channel 106 can have an inlet end 112 that is separate or spaced from the main grain discharge channel 102. Grain being discharged from the grain dryer 104 can flow in a discharge direction 214 toward the inlet end 108 of the main discharge channel 102. As the grain being discharged flows toward the inlet end 108 of the main discharge channel 102 in the discharge direction 214, some of the grain that passes over the inlet end 112 of the sensor channel 106 can enter the sensor channel 106 through its inlet end 112. The remainder of the grain being discharged can continue to flow in the discharge direction 214 toward and into the inlet end 108 of the main discharge channel 102.

As in this example, the sensor channel 106 can be quite short. For example, the overall length of the sensor channel 106 along its grain sensor flow path 118 between its inlet end 112 and its outlet end 114 can be essentially only that necessary to accommodate the parallel plate moisture sensor 120 and the metering conveyor 158. The outlet end 114 of the sensor channel 106 can join the main discharge channel 102 between the inlet end 108 and the outlet end 110 thereof, and the outlet end 114 of the sensor channel 106 can join the main discharge channel 102 adjacent the inlet end 108 of the main discharge channel 102. The outlet end 114 of the sensor channel 106 can correspond to an outlet of the metering conveyor 158.

The calibration sample channel 166 can extend from a side wall 168 of the sensor channel 106 through an opening 170 therein that forms the inlet end 172 of the calibration sample channel 166. The opening 170 in the sensor side wall 168 and the inlet end 172 can be positioned along the sensor channel 106 between the moisture sensor 120 and the outlet end 114 thereof. As in this embodiment, the opening 170 in the side wall 168 and corresponding inlet end 172 of the calibration sample channel 166 can be positioned in a sidewall 168 at the metering conveyor 158 within the sensor channel 106. Similarly, the opening 170 in the side wall 168 and corresponding inlet end 172 can be positioned along the sensor channel 106 between an inlet and outlet of the metering conveyor 158. Also as in the instant example, the vanes or paddles 216 of the paddle wheel 162 of the metering conveyor 158 can pass across or over the opening 170 in operation.

As described above, a calibration sample can periodically be taken from the sensor channel 106 through the calibration sample channel 166 by opening the gate 174. This can cause the gate position sensor 178 to send an "open" signal to the grain dryer system control circuit 218. In response to this gate "open" signal, the grain dryer system control circuit 218 can be configured to stop and reverse the operating direction of the metering conveyor 158. This can insure the grain flowing into the calibration sample channel 166 comes directly from the moisture sensor 120. In other words, reversing the direction of the metering conveyor 158 at this time can eliminate the comingling of any grain that has been carried the long way around the paddle wheel 162 back from adjacent the outlet end 114 of the grain sensor flow path 118 into the calibration sample with the grain flowing into the metering conveyor 158 from the moisture sensor 120.

Thus, the calibration sample taken from the calibration sample channel 166 can include essentially no grain that was not present within the known grain sample volume 154 and the sensed volume 156 at the corresponding time that the calibration sample is taken through the calibration sample channel 166. As a result, a single calibration sample taken from the calibration sample channel 166 from which a testing sample (e.g. 100 g) can be taken and input into the calibration device to provide accurate or useful calibration results. Due to the variability in the grain sensed volume and the comingling of sensed grain with grain that has not been sensed in calibration samples taken in prior grain dryer output or dry capacitive moisture sensors, accuracy of calibration results can be unacceptably low if each testing sample includes grain from only a single calibration sample taken from the calibration sample channel 166. As a result, a user is typically instructed to take multiple calibration samples (e.g., 3) that are spaced apart from each other in time (e.g., 2 minutes apart). These multiple calibration samples are then mixed together by the user and then the testing sample (e.g., 100 g) is taken from this mixture of multiple calibration samples. Thus, the example embodiments herein can eliminate the time, complexity, costs, and errors associated with providing and following such multi-step instructions to obtain a testing sample.

Figure 27:
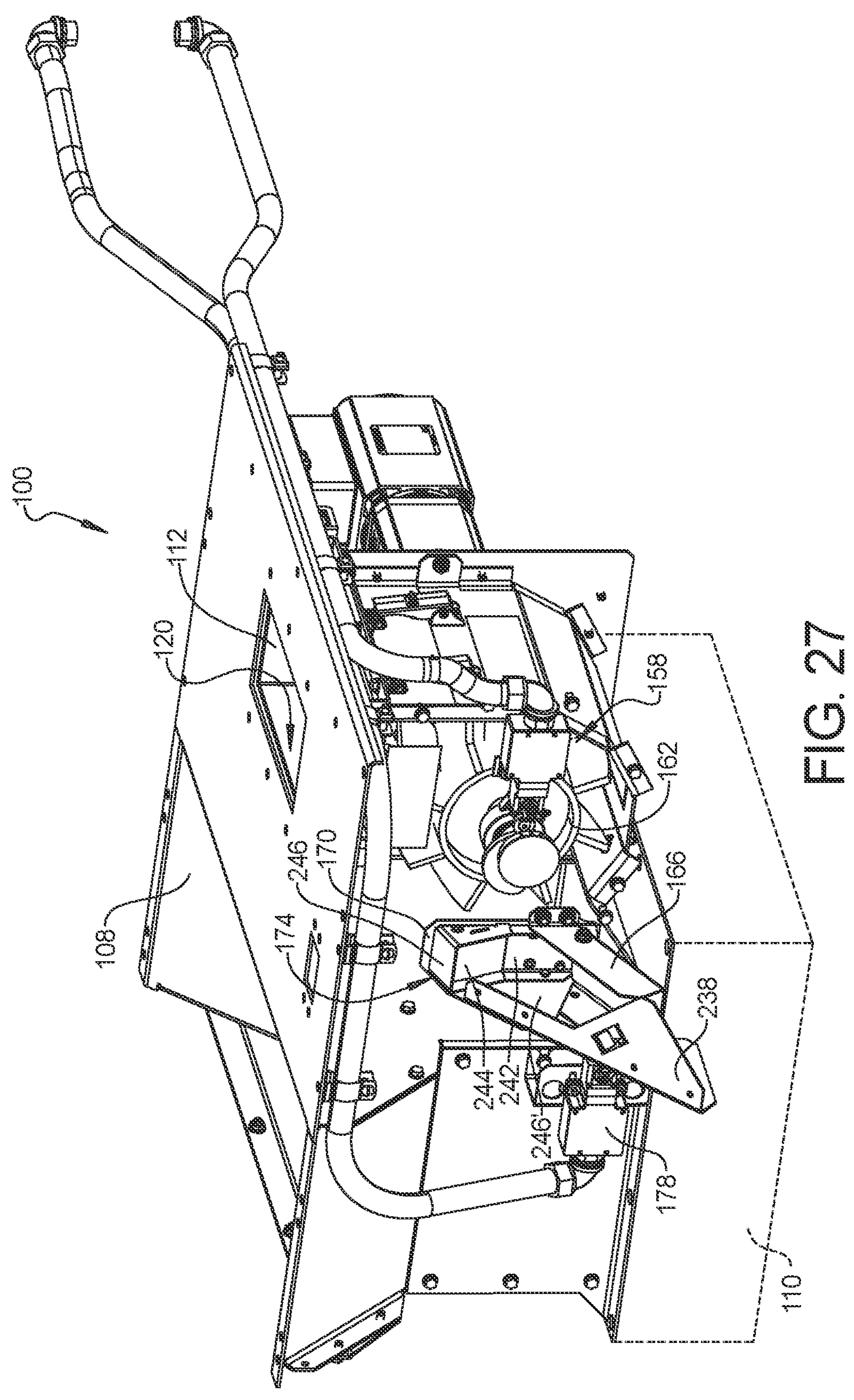
FIG. 27 is a perspective view with a portion of a side panel removed of another example embodiment of a grain dryer output capacitive moisture sensing assembly in accordance with the present disclosure.
Figure 28:
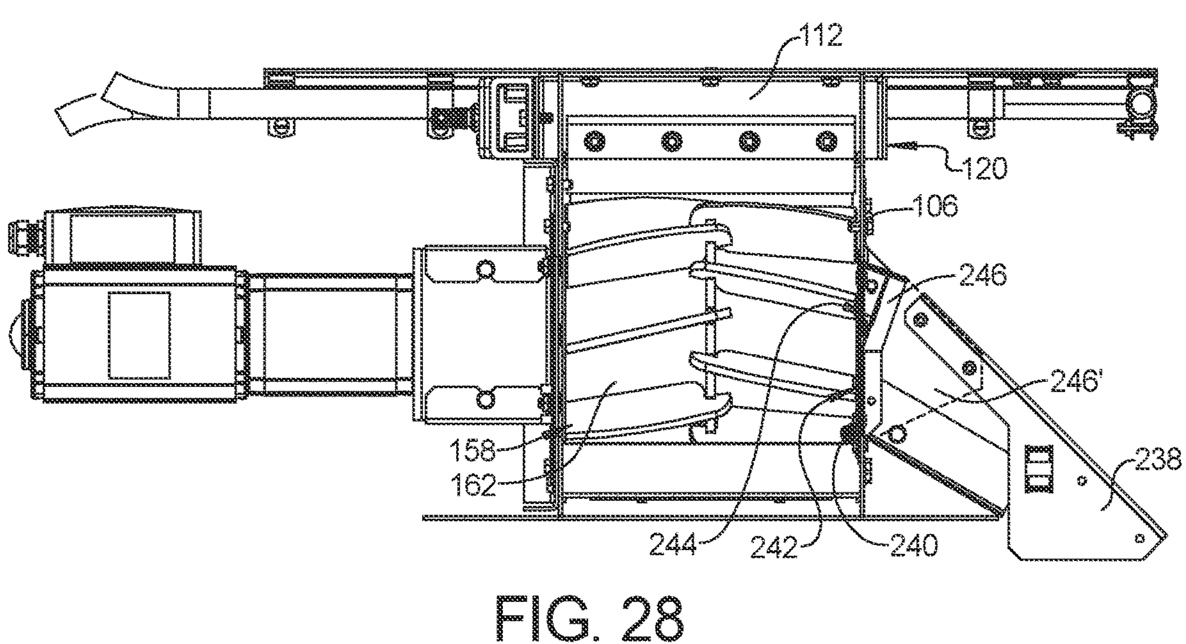
FIG. 28 is a cross-sectional view of the example assembly of FIG. 27 with the gate in a closed position blocking the sensor channel opening.
Figure 29:
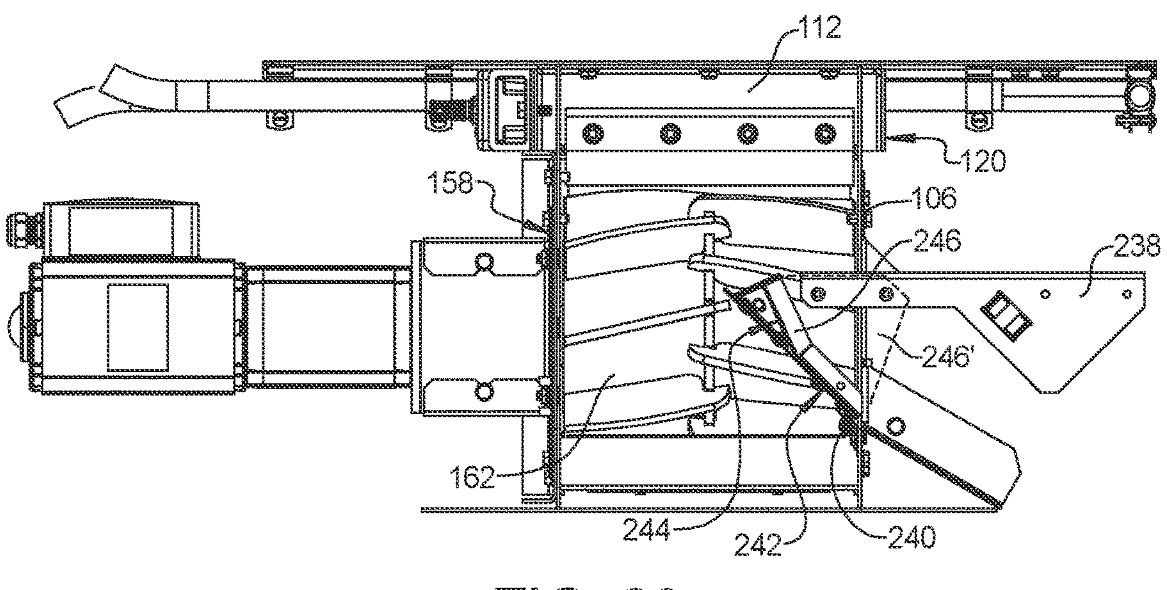
FIG. 29 is a cross-sectional view similar to FIG. 27 with the gate in an open position allowing grain to flow through the sensor channel opening.

FIGS. 27-29 illustrate another example embodiment of a grain dryer output capacitive moisture sensing assembly 100 in accordance with the present disclosure. This example embodiment 100 is similar to the example embodiment of FIGS. 22-26. The position of the sensor channel opening 170 and the configuration and operation of the gate 178, however, is different. For example, the sensor channel opening 170 can be positioned in a side wall that extends from the bottom side wall 168 of the sensor channel 106 and at or adjacent an outlet end or downstream side of the metering conveyor 158. As in this example, grain exiting the capacitive moisture sensor 120 can move into the metering conveyor 158. Counter-clockwise rotation of the metering conveyor 158 (as viewed in FIG. 27) can carry grain along a grain sensor flow path 118 interiorly adjacent to the sensor channel opening 170.

A gate 174 can pivot between a closed position (FIG. 28) in which the gate 174 covers or blocks the sensor channel opening 170 and an open position (FIG. 29) in which the gate 174 permits grain to flow through the sensor channel opening 170. The gate 174 can include a manually actuatable handle or arm 238 to move or pivot the gate 174 between its open and closed positions. As in this example, the gate 174 can be coupled to a vertically oriented side wall of the sensor channel 106 via a hinge 240. As another example, the gate 174 can be coupled to a side wall of the sensor channel 106 that is oriented perpendicular to a vertically oriented plane such as the bottom side wall.

In the open position of the gate 174, the gate 174 can extend from a side wall of the sensor channel 106 to which it is coupled into the interior of the sensor channel 106. In the open position, guide surfaces 242, 244, 246 can be positioned to capture grain exiting the metering conveyor 158 by falling from an outlet end or downstream side of the metering conveyor 158. As in this example the metering conveyor 158 can be a paddle wheel 162. In the open position, the gate 174 can include guide surfaces 242, 244, 246 that are positioned within the interior of the sensor channel 106 can have a shape that is designed to guide grain from the interior of the sensor channel 106 to, and through, the sensor channel opening 170. The guide surfaces 242, 244, 246 can form a scoop shape.

The guide surfaces 242, 244, 246 can include main guide surfaces 242, 244 oriented to guide grain toward the sensor channel opening 170 and peripheral guide surfaces 246 oriented to guide grain toward the main guide surfaces 242, 244, including retaining grain on the main guide surfaces 242, 244. The main guide surfaces 242, 244 can include a first main guide surface 242 that extends at a first angle relative to horizontal in the open position and a second main guide surface 244 that is coupled to an interior end of the first main guide surface 242 and that extends at a second angle relative to horizontal in the open position, which second angle is greater that the first angle. An extended downstream peripheral guide surface 246' can extend from the handle 238 to the main guide surfaces 242, 244 along the overall length of the main guide surfaces 242, 244.

Figure 30:
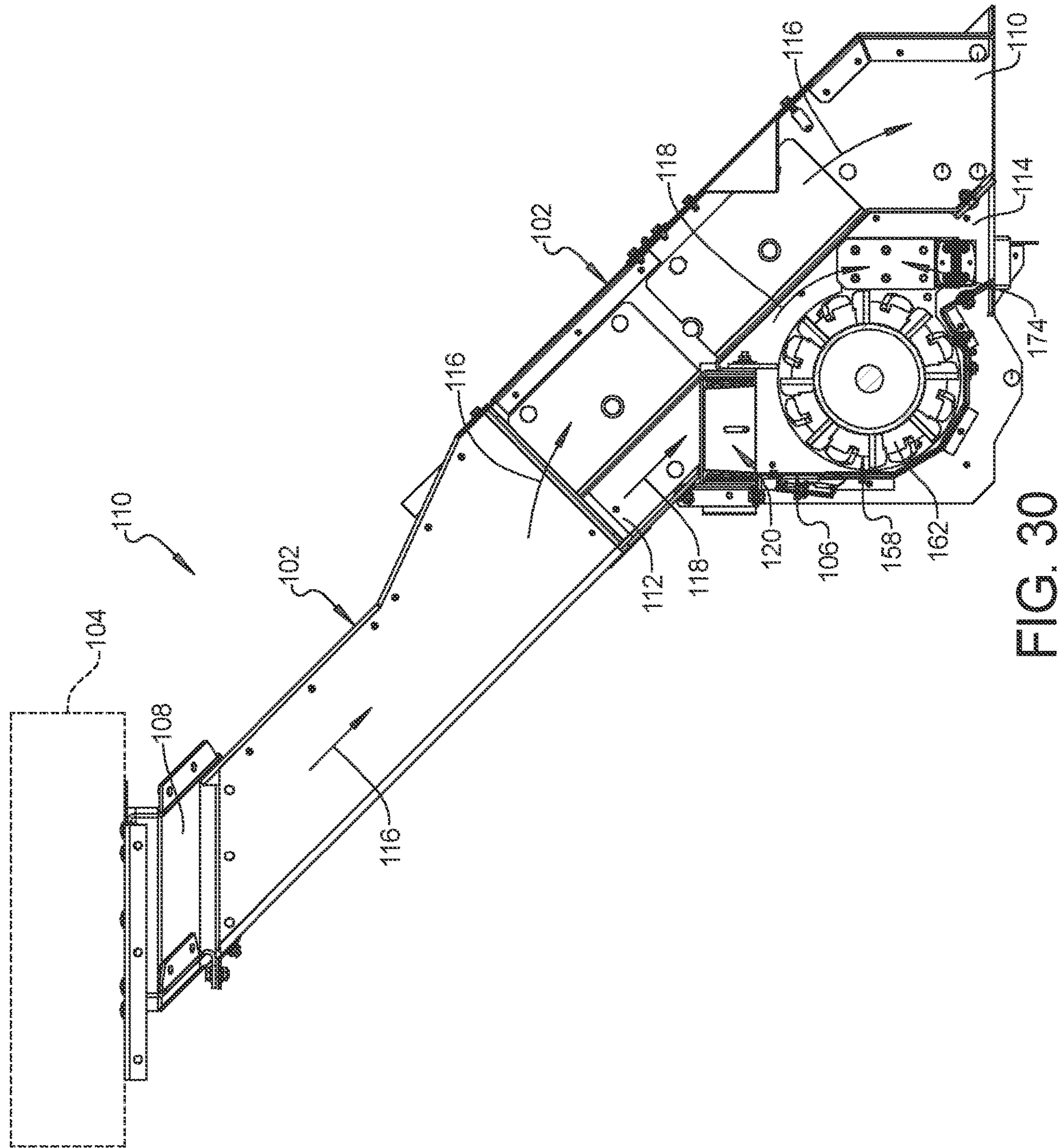
FIG. 30 is a central longitudinal cross-sectional view of another example embodiment of a grain dryer output capacitive moisture sensing assembly in accordance with the present disclosure.

FIG. 30 illustrates another example embodiment of a grain dryer output capacitive moisture sensing assembly 100 in accordance with the present disclosure. This example embodiment is similar to the prior example embodiments. In the prior example embodiments, the inlet end 112 of the sensor channel 106, capacitive moisture sensor 120, and the metering conveyor 158 are illustrated positioned at or adjacent the inlet end 108 of the main discharge channel 102. In this example, however, the inlet end 112 of the sensor channel 106, the capacitive moisture sensor 120, and the metering conveyor 158 are all positioned at or adjacent the outlet end 110 of the main discharge channel 102. In addition, the position and configuration of the sensor channel opening 170 and the gate 178 relative to the metering conveyor 158 and operation of the gate 174 are essentially the same as that of the example of FIGS. 27-29.

Various methods within the scope of the present disclosure should be apparent from the discussion herein. In some cases for example, such methods can include providing, assembling, configuring, or operating one or more of the features or components of a grain dryer outlet moisture sensing assembly 100 or sensor 120 in one or more of the various ways described and illustrated herein. This can include for example, operating, or configuring the sensor controller or control circuit 194 to operate, one or more components of a grain dryer output moisture sensing assembly 100 in one or more of the various ways described and illustrated herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A grain dryer output capacitive moisture sensor assembly comprising:

a main discharge channel structured to carry a main portion of a grain dryer output from a grain dryer during operation of the grain dryer;

a sensor channel positioned adjacent the main discharge channel and structured to carry a sensed portion of the grain dryer output from the grain dryer during operation of the grain dryer;

a grain moisture sensor including a pair of capacitive plates positioned on opposite sides of the sensor channel with opposing major surfaces of the pair of capacitive plates facing each other;

a calibration sample channel extending from an opening of the sensor channel located between an inlet end of the sensor channel and an outlet end of the sensor channel;

a gate movable between an open position and a closed position with respect to the opening of the sensor channel to selectively output a calibration sample of the sensed portion of the grain dryer output from the sensor channel to the calibration sample channel through the opening; and a control circuit including a gate position sensor configured to sense each of the open position of the gate and the closed position of the gate, wherein the control circuit is configured to determine calibration sample removal timing information based on when the gate is in the open position and to match the calibration sample removal timing information to corresponding moisture sensor data timing information to identify moisture sensor data that was collected when the calibration sample was present in the sensor channel between the pair of capacitive plates of the grain moisture sensor.

2. The grain dryer output capacitive moisture sensor assembly of claim 1, wherein the gate includes guide surfaces that are positioned in an interior of the sensor channel when the gate is in the open position and that are configured to guide grain from the interior of the sensor channel out of the opening.

3. The grain dryer output capacitive moisture sensor assembly of claim 2, wherein the guide surfaces include a first main guide surface that extends at a first angle relative to horizontal when the gate is in the open position and a second main guide surface that is coupled to an interior end of the first main guide surface and that extends at a second angle relative to horizontal when the gate is in the open position, which second angle is greater that the first angle.

4. The grain dryer output capacitive moisture sensor assembly of claim 2, wherein the guide surfaces include a main guide surface and peripheral guide surfaces positioned within the interior of the sensor channel when the gate is in the open position and forming a shape designed to guide grain from the interior of the sensor channel to the opening of the sensor channel.

5. The grain dryer output capacitive moisture sensor assembly of claim 1, wherein the opposing major surfaces of the pair of capacitive plates are oriented vertically and positioned in a vertically oriented portion of the sensor channel.

6. The grain dryer output capacitive moisture sensor assembly of claim 1, wherein the outlet end of the sensor channel merges into the main discharge channel such that a sensor flow path of the sensor channel exits the sensor channel into a discharge flow path of the main discharge channel.

7. The grain dryer output capacitive moisture sensor assembly of claim 1, wherein the inlet end of the sensor channel extends from the main discharge channel such that a sensor flow path of the sensor channel separates from a main discharge flow path of the main discharge channel and flows into the inlet end of the of the sensor channel.

8. The grain dryer output capacitive moisture sensor assembly of claim 7, wherein the outlet end of the sensor channel merges into the main discharge channel such that the sensor flow path of the sensor channel exits the sensor channel into the main discharge flow path of the main discharge channel.

9. The grain dryer output capacitive moisture sensor assembly of claim 1, wherein a metering conveyor is provided in the sensor channel downstream of the grain moisture sensor.

10. The grain dryer output capacitive moisture sensor assembly of claim 9, wherein the metering conveyor is a paddle wheel.

11. The grain dryer output capacitive moisture sensor assembly of claim 9, wherein an inlet end of the metering conveyor is coupled to a vertical portion of a sensor flow path of the sensor channel.

12. The grain dryer output capacitive moisture sensor assembly of claim 9, wherein an outlet end of the grain moisture sensor is directly coupled to an inlet end of the metering conveyor.

13. The grain dryer output capacitive moisture sensor assembly of claim 1, further comprising a grain temperature sensor extending into an interior of a sensed volume defined between the pair of capacitive plates to take a grain temperature reading from an interior of the sensed volume.

14. The grain dryer output capacitive moisture sensor assembly of claim 1, wherein each of the opposing major surfaces of the pair of capacitive plates includes a plurality of sub-plates.

15. The grain dryer output capacitive moisture sensor assembly of claim 14, wherein a pair of the sub-plates at each upper corner of each of the pair of capacitive plates enables generation of a grain presence electric field across each of the pair of the sub-plates at each upper corner of each of the pair of capacitive plates.

16. The grain dryer output capacitive moisture sensor assembly of claim 14, wherein a main sub-plate of each of the pair of capacitive plates enables generation of a moisture sensing electric field between the main sub-plates of the pair of capacitive plates.

17. The grain dryer output capacitive moisture sensor assembly of claim 16, wherein an upper peripheral sub-plate of each of the pair of capacitive plates enables generation of an upper sacrificial electric field between the upper peripheral sub-plate of each of the pair of capacitive plates and above the moisture sensing electric field between the main sub-plates of the pair of capacitive plates.

18. The grain dryer output capacitive moisture sensor assembly of claim 16, wherein a lower peripheral sub-plate of each of the pair of capacitive plates enables generation of a lower sacrificial electric field between the lower peripheral sub-plate of each of the pair of capacitive plates and below the moisture sensing electric field between the main sub-plates of the pair of capacitive plates.

19. The grain dryer output capacitive moisture sensor assembly of claim 18, wherein an upper peripheral sub-plate of each of the pair of capacitive plates enables generation of an upper sacrificial electric field between the upper peripheral sub-plate of each of the pair of capacitive plates and above the moisture sensing electric field between the main sub-plates of the pair of capacitive plates.

20. The grain dryer output capacitive moisture sensor assembly of claim 16, wherein lateral end peripheral sub-plates of each of the pair of capacitive plates enables generation of a sacrificial electric field between the lateral end peripheral sub-plates of each of the pair of capacitive plates at each lateral end of the moisture sensing electric field between the main sub-plates of the pair of capacitive plates.

21. The grain dryer output capacitive moisture sensor assembly of claim 1, wherein both of the pair of capacitive plates are electrically insulated from adjacent metal and dedicated electrical source lines that are electrically insulated from adjacent metal entirely form an electrical power source path that extends from an external electrical power source to the pair of capacitive plates, and the dedicated electrical source lines entirely form an electric return line that extends from a second of the pair of capacitive plates to the external electrical power source.

22. A grain dryer output capacitive moisture sensor assembly comprising:

a main discharge channel structured to carry a main portion of a grain dryer output from a grain dryer during operation of the grain dryer;

a sensor channel positioned adjacent the main discharge channel and structured to carry a sensed portion of the grain dryer output from the grain dryer during operation of the grain dryer;

a grain moisture sensor including a pair of capacitive plates positioned on opposite sides of the sensor channel with opposing major surfaces of the pair of capacitive plates facing each other;

a calibration sample channel extending from an opening of the sensor channel located between an inlet end of the sensor channel and an outlet end of the sensor channel;

a gate movable between an open position and a closed position with respect to the opening of the sensor channel to selectively output a calibration sample of the sensed portion of the grain dryer output from the sensor channel to the calibration sample channel through the opening; and a sensor control circuit including a gate position sensor configured to sense each of the open position of the gate and the closed position of the gate, wherein the grain moisture sensor including the pair of capacitive plates are part of a removable sensor unit that forms a portion of the sensor channel.

23. The grain dryer output capacitive moisture sensor assembly of claim 22, wherein the removable sensor unit has an opened bottom drawer configuration that slides into and out of position with the sensor channel.

24. The grain dryer output capacitive moisture sensor assembly of claim 22, wherein the removable sensor unit includes a grain temperature sensor.

25. The grain dryer output capacitive moisture sensor assembly of claim 24, wherein the grain temperature sensor extends into an interior of a sensed volume defined between the pair of capacitive plates to take a grain temperature reading from the interior of the sensed volume.

* * * * *